(12) United States Patent  (10) Patent No.: US 6,369,984 B1
Sato  (45) Date of Patent: Apr. 9, 2002

(54) THIN FILM MAGNETIC HEAD WITH BACK INSULATING LAYER LAMINATED ON BACK REGION OF GAP LAYER PROVIDED IN INSULATING LAYER TRENCH

(75) Inventor: Kiyoshi Sato, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/536,786

(22) Filed: Mar. 28, 2000

(30) Foreign Application Priority Data

Mar. 31, 1999 (JP) .......................................... 11-094314

(51) Int. Cl.$^7$ .............................. G11B 5/31; G11B 5/23; G11B 5/39
(52) U.S. Cl. ...................... 360/126; 360/119; 360/317
(58) Field of Search ................................. 360/317, 126, 360/119, 122, 120, 121, 125

(56) References Cited

U.S. PATENT DOCUMENTS

| | | |
|---|---|---|
| 5,452,164 A | 9/1995 | Cole et al. |
| 5,649,351 A | 7/1997 | Cole et al. |
| 5,652,687 A | 7/1997 | Chen et al. |
| 5,802,700 A | 9/1998 | Chen et al. |
| 6,169,642 B1 * | 1/2001 | Mino et al. .................. 360/126 |
| 6,188,544 B1 * | 2/2001 | Mino .......................... 360/126 |

* cited by examiner

*Primary Examiner*—Craig A. Renner
(74) *Attorney, Agent, or Firm*—Brinks Hofer Gilson & Lione

(57) ABSTRACT

An upper core layer and a lower core layer are extended from a back region to a pole tip region so that the surfaces thereof are exposed from a medium-facing surface, and a back insulating layer made of a novolak resin and having an apex surface formed by post baking is formed in the back region on a gap layer provided between the upper core layer and the lower core layer. Furthermore, an upper pole layer is formed on the pole tip region side of the gap layer by electroplating using the gap layer as an electrode so that the gap depth Gd is determined by the length from the medium-facing surface to the back insulating layer in a portion of the upper pole layer which contacts the gap layer, and a coil is partially provided on the back insulating layer.

7 Claims, 24 Drawing Sheets

THIN FILM MAGNETIC HEAD WITH BACK INSULATING LAYER LAMINATED ON BACK REGION OF GAP LAYER PROVIDED IN INSULATING LAYER TRENCH

BACKGROUND OF THE INVENTION

1. Field of the Invention

The present invention relates to a thin film magnetic head and a method of producing the same. Particularly, the present invention relates to techniques preferably used for a thin film magnetic head having a track width of 1 µm or less, and for a method of producing the same.

2. Description of the Related Art

FIG. 33 is a perspective view showing a magnetic head 150 comprising a conventional combination type thin film magnetic head provided on a slider, and FIG. 34 is a sectional view showing a principal portion of the magnetic head 150 shown in FIG. 33.

The floating magnetic head 150 mainly comprises a slider 151, and a combination type thin film magnetic head 157 provided on the slider 151, as shown in FIG. 33. Reference numeral 155 denotes the leading side on the upstream side of the slider 151 in the movement direction of a magnetic recording medium, and reference numeral 156 denotes the trailing side on the downstream side in the movement direction. In the slider 151, rails 151a and 151b are formed on the medium-facing surface 152 opposed to the magnetic recording medium to form air grooves 151c between the respective rails.

The combination type thin film magnetic head 157 is provided on the end surface 151d on the trailing side 156 of the slider 151.

FIG. 35 is a perspective view showing the principal portion of the combination type thin film magnetic head 157.

The combination type thin film magnetic head 157 comprises a MR magnetic head h1 comprising a magnetoresistive element, and a thin film magnetic head h2 serving as a write head, both of which are laminated on the end surface 151d of the slider 151, as shown in FIG. 34 and 35.

The MR magnetic head h1 comprises a lower shielding layer 163 made of a magnetic alloy and formed on the end surface 151d of the slider 151, a lower gap layer 164 laminated on the lower shielding layer 163, a magnetoresistive element 165 partially exposed from the medium-facing surface 152, an upper gap layer 166 formed to cover the magnetoresistive element 165 and the lower gap layer 164, and an upper shielding layer 167 formed to cover the upper gap layer 166.

The upper shielding layer 167 also serves as a lower core layer of the thin film magnetic head h2.

The MR magnetic head h1 is used as a read head in which a small leakage magnetic field from the magnetic recording medium is applied to the magnetoresistive element 165 to cause a change in resistance of the magnetoresistive element 165 so that a change in voltage based on the change in resistance is read out as a reproduction signal of the magnetic recording medium.

The thin film magnetic head h2 comprises a lower core layer (the upper shielding layer) 167, a gap layer 174 laminated on the lower core layer 167, a coil 176 formed on the back region Y side of the gap layer 174, an upper insulating layer 177 formed to cover the coil 176, and an upper core layer 178 formed to be joined to the gap layer 174 in a pole tip region X and to the lower core layer 167 in the back region Y.

The coil 176 is patterned to have a spiral planar shape. The base end 178b of the upper core layer 178 is magnetically connected to the lower core layer 167 in the central portion of the coil 176.

Furthermore, a protecting layer 179 made of alumina or the like is laminated on the upper core layer 178.

The lower core layer 167, the gap layer 174, and the upper core layer 178 are extended from the back region Y to the pole tip region X of the combination type thin film magnetic head 157, and exposed from the medium-facing surface 152. In the medium-facing surface 152, the upper core layer 178 and the lower core layer 167 are opposed to each other with the gap layer 174 held therebetween to form a magnetic gap.

As shown in FIG. 34, the pole tip region X means the region where the upper core layer 178 and the lower core layer 167 are opposed to each other with only the gap layer 174 held therebetween, and the back region Y means the region excluding the pole tip region X.

The thin film magnetic head h2 is used as a write head in which the supply of a recording current to the coil 176 causes a magnetic flux in the upper core layer 178 and the lower core layer 167 due to the recording current, and the magnetic flux leaks to the outside from the magnetic gap to produce a leakage magnetic field, thereby recording a recording signal by magnetization of the magnetic recording medium due to the leakage magnetic field.

In producing the thin film magnetic head h2, the lower core layer 167, the gap layer 174, and the upper core layer 178 are previously laminated in turn and patterned. The upper core layer 178 is processed by a flame plating method and ion milling, and the exposure width of the upper core layer 178 exposed from the medium-facing surface 152 is defined by the resist width in the flame plating method, and plating and etching processes. The magnetic recording track width is defined by the exposure width of the upper core layer 178 exposed from the medium-facing surface 152.

The magnetic recording track width (the exposure width of the upper core layer 178 exposed from the medium-facing surface on the pole tip side) of the thin film magnetic head h2 is set to a small value to decrease the track width of the magnetic recording medium, thereby increasing the recording density of the magnetic recording medium.

However, the conventional thin film magnetic head h2 has a step formed by the coil layer 176 and the upper insulating layer 177, thereby increasing the thickness of the resist film which constitutes the upper core layer 178. Therefore, even if each of these layers is precisely formed by flame plating, and the pole tip is processed with the present highest processing precision, the limit of resolution in exposure for forming a resist pattern causes difficulties in decreasing the magnetic recording track width to 1 µm or less, thereby causing a problem in that the recording density of the magnetic recording medium cannot be improved.

In some cases, in order to improve the recording density, a magnetic layer made of a material having a high saturation flux density is laminated on each of the lower core layer 167 and the upper core layer 178 to form a two-layer structure, and in order to set a magnetic recording gap depth Gd, a gap layer 174 and a portion 178A of the upper core layer 178 are laminated on the lower core layer 167, and a liftoff resist 81 is formed on the portion 178A of the upper core layer 178, as shown in FIG. 36. Then, an end surface 178a is formed in the portion 178A of the upper core layer 178 by ion milling, as shown in FIG. 37, and an insulating layer 83 is then formed by sputtering or the like, as shown in FIG. 38. FIG. 39 shows a state in which the liftoff resist 81 is removed, and an upper core layer 178B is further formed. FIG. 39 is an enlarged sectional view of portion A shown in FIG. 34, as viewed from the back of the drawing.

In some cases, in the pole tip region X, the back region side end of the portion 178A of the upper core layer 178 which holds the gap layer 174 between the upper core layer 178 and the lower core layer 167, i.e., the end surface 178a which defines the depth of the magnetic gap from the medium-facing surface, gap depth Gd, is not parallel to the medium-facing surface 152, as shown in FIG. 38. In this case, the leakage magnetic field is increased in the vicinity of the end surface 178a, thereby causing the probability of deteriorating the writing ability of the thin film magnetic head, and a position of the end surface 178a where the gap depth Gd is defined is indefinite because the end surface 178a is not parallel to the medium-facing surface 152, as shown in FIG. 38. This causes deterioration or variations in overwrite performance of the write head, and there is thus the demand for precisely setting the gap depth Gd.

With the magnetic gap width set to a small value, in order to form the end surface 178a for defining the gap depth Gd, and form the insulating layer 83, the liftoff resist 81 is used in the production process, in which a notch 81a is formed in the liftoff resist 81 in order to separate a deposited layer 82 deposited on the liftoff resist 81 by sputtering or the like, as shown in FIGS. 36 to 38. Therefore, the liftoff resist 81 is formed to overhang the end surface 178a which defines the gap depth Gd. In this state, the formation position of the end surface 178a which defines the gap depth Gd cannot be discriminated as viewed in plane, thereby causing the problems of deteriorating the setting precision of the gap depth Gd, and deteriorating the overwrite performance of the write head.

In order to separate the liftoff resist 81 and the deposited layer 82, it is also necessary that no deposited layer is deposited in the notch 81a of the liftoff resist 81, as shown in FIG. 38. Therefore, in order to improve the linearity of sputtered particles in formation of the insulating layer 83, long throw sputtering must be used, in which the distance between a substrate serving as the thin film magnetic head h2 and a target is set to be twice a general value. However, this long throw sputtering requires a deposition rate of about 100 angstroms/min, and thus an improvement of low productivity is demanded.

Furthermore, in some cases, in order to prevent a leakage magnetic field from the vicinity of the end surface 178a which defines the gap depth Gd, an apex surface 83a having an inclination with respect to the lower core layer 167 is formed in the insulating layer 83, as shown in FIG. 38. However, with the apex surface 83a having an insufficient angle, an auxiliary layer 84 must be further formed on the insulating layer 83, increasing the number of the work steps, and deteriorating the efficiency of production. There is thus the problem of deteriorating the precision of position setting in the auxiliary layer 84 for the gap depth Gd.

SUMMARY OF THE INVENTION

In consideration of the above-mentioned present situation, the present invention is aimed for at least one of the following objects:

(1) To provide a thin film magnetic head having a narrow magnetic recording track width of 1 μm or less corresponding to a track width of 1 μm or less.

(2) To improve the precision of the gap depth of the magnetic recording track from a medium-facing surface in the magnetic head.

(3) To improve the overwrite performance of a write head of a thin film magnetic head.

(4) To provide a method of producing a thin film magnetic head which permits simplification of the production process, and shortening of the production time.

In order to achieve the above objects, the present invention comprises the following construction.

A thin film magnetic head of the present invention comprises an upper core layer and a lower core layer which are extended from a back region to a pole tip region so that the end surfaces thereof are exposed from a medium-facing surface, and which are connected to each other in the back region; a coil provided around the connection portion between the upper and lower core layers; a gap layer provided between the upper and lower core layers in the pole tip region; an insulating layer laminated on the lower core layer; a trench provided in the insulating layer to extend from the medium-facing surface in the pole tip region to the back region so that a lower pole layer and the gap layer are laminated in the trench; a back insulating layer laminated on the back region side of the gap layer; and an upper pole layer laminated on the pole tip region side of the gap layer; wherein the lower and upper pole layers are connected to the lower and upper core layers, respectively, the upper and lower pole layers form the upper and lower pole tips, respectively, the back insulating layer is connected to the upper pole layer and the upper core layer, and the gap depth is determined by the length from the medium-facing surface to the back insulating layer in a portion of the upper pole layer which contacts the gap layer.

In the present invention, the pole tip region side end of the back insulating layer is inserted into between the gap layer and the upper pole layer so that the gap depth can be determined by the pole tip region side end of the back insulating layer.

The back insulating layer of the present invention preferably comprises an apex surface which is inclined so that the thickness increases from the medium-facing surface side to the back region side.

In the present invention, the back insulating layer may be made of a positive photoresist such as a novolak resin.

In the present invention, the technique of providing a part of the coil on the back insulating layer can be used.

In the present invention, the technique of providing the upper pole layer in the trench can be selected.

The exposure width of the gap layer exposed from the medium-facing surface can be set to 1 μm or less.

In the present invention, for example, the upper side of the lower core layer may be polished to a flat surface, the inclination angle of the apex surface of the back insulating layer may be in the range of 10 to 80 degrees with respect to the lower core layer, and the back insulating layer may be continuously extended above the insulating layer.

It is possible to select the technique of laminating a reading magnetic head comprising a MR magnetic head or a GMR magnetic head comprising a magnetoresistive element, and a thin film magnetic head in which the above-described means are selected, to form a combination type thin film magnetic head.

In the thin film magnetic head of the present invention, the lower core layer and the lower pole layer form a lower core, the upper core layer and the upper pole layer form a n upper core, and the lower pole layer, the gap layer and the upper pole layer form a magnetic gap which is interposed between the upper and lower cores.

Since the lower pole layer, the gap layer and the upper pole layer which form the magnetic gap are laminated in the previously formed trench, the magnetic recording track width is determined by the width of the trench.

Therefore, by setting the trench width to a small value, the magnetic recording track width can be decreased to, for example, 1 μm or less on the sub-micron order.

In the present invention, since the gap depth is determined by the length from the medium-facing surface to the back insulating layer in a portion of the upper pole layer which contacts the gap layer, the gap depth of the magnetic gap can be set by the position of the back insulating layer. It is thus possible to prevent variations in the distance from the medium-facing surface to the end of the upper pole layer, and thus prevent variations in the gap depth, improve the overwrite performance of the write head, and decrease variations.

Since the apex surface is formed on the gap depth side of the back insulating layer, a taper portion is formed on the upper pole layer side of the upper core layer. Furthermore, where an inclined portion is formed in the trench, and the upper pole layer is laminated over the inclined portion and the trench main body to be joined to the upper core layer, the taper portion can be formed on the upper core layer side of the upper pole layer. The presence of these taper portions causes a smooth magnetic flux flow between the upper core layer and the upper pole layer, thereby decreasing a leakage magnetic field from the joint between the upper core layer and the upper pole layer.

Since the upper surface of the lower core layer is polished to a flat surface having surface roughness Ra in the range of 0.0005 to 0.01 μm, the trench can be precisely formed, and the magnetic recording track width can be further decreased.

Since the trench width is 1 μm or less, more preferably 0.5 μm or less, the magnetic recording track width can be set to 1 μm or less.

In the thin film magnetic head of the present invention, the inclination angle of the apex surface of the back insulating layer is preferably in the range of 10 to 80 degrees with respect to the lower core layer.

With the apex surface having an inclination angle of less than 10 degrees, reactance between the upper and lower core layers is decreased to increase a leakage magnetic field from the upper core layer to the upper pole layer in the vicinity of the apex surface at the back end of the gap, thereby undesirably deteriorating recording efficiency. With the apex surface having an inclination angle of over 80 degrees, the sectional shape of the upper core layer cannot be inevitably formed to a smooth shape, and thus the sectional shape of the upper core layer becomes partially acute, thereby increasing a demagnetizing field in the upper core layer near the acute portion and undesirably deteriorating recording efficiency.

In the thin film magnetic head of the present invention, the insulating layer, the lower pole layer, the gap layer and the upper pole layer are preferably exposed from the medium-facing surface. In this construction, the magnetic recording track width in the medium-facing surface coincides with the trench width of the insulating layer, and thus the magnetic recording track width can be set to a small value. In addition, since the magnetic gap is exposed from the medium-facing surface, magnetic recording on the magnetic recording medium can be efficiently performed by a leakage magnetic field from the magnetic gap.

In the thin film magnetic head of the present invention, since the back insulating layer is made of a novolak resin, the apex surface can be formed in the back insulating layer by post baking, as described below. In addition, the upper pole layer can be formed by electroplating using the gap layer as an electrode, as described below, to improve the position setting precision of the gap depth, and the coil can be formed on the back insulating layer.

The insulating layer is preferably made of any one of AlO, $Al_2O_3$, SiO, $SiO_2$, $Ta_2O_5$, TiO, AlN, AlSiN, TiN, SiN, $Si_3N_4$, NiO, WO, $WO_3$, BN, and CrN, and it may comprise a single layer film or multilayer films. With the insulating layer comprising the above material, the trench can be formed by anisotropic etching without side etching, thereby improving the dimensional precision of the trench width to the trench depth.

The gap layer is preferably made of at least one of Au, Pt, Rh, Pd, Ru, Cr, NiMo alloys, NiW alloys, NiP alloys and NiPd alloys, and may comprise a single layer film or multilayer films. These materials are nonmagnetic materials which are not magnetized, and are optimum for forming the gap layer of the thin film magnetic head. These materials are also metallic materials, and can thus be laminated in the trench by electroplating using the lower core layer as an electrode.

The lower pole layer is preferably made of any one of FeNi alloys, FeNi alloys containing Fe at a higher concentration than Ni, and CoFeNi alloys, and may comprise a single layer film or multilayer films. These materials are magnetic materials having excellent soft magnetic properties, and are optimum for forming the core of the thin film magnetic head. These materials are also metallic materials and can thus be laminated in the trench by electroplating using the lower core layer as an electrode.

The upper pole layer is preferably made of any one of FeNi alloys, FeNi alloys containing Fe at a higher concentration than Ni, and CoFeNi alloys, and may comprise a single layer film or multilayer films. These materials are magnetic materials having excellent soft magnetic properties, and are optimum for forming the core of the thin film magnetic head. These materials are also metallic materials and can thus be laminated in the trench by electroplating using the gap layer as an electrode. Therefore, the lamination position of the upper pole layer can be set by the back insulating layer to improve the precision of gap depth position setting, and the upper pole layer can be securely formed so that the width of the upper pole layer coincides with the trench width.

The present invention also provides a method of producing a thin film magnetic head comprising upper and lower core layers which are extended from a back region to a pole tip region so that the end surfaces thereof are exposed from a medium-facing surface, and which are connected to each other in the back region; a coil provided around the connection portion between the upper and lower core layers; and a gap layer provided between the upper and lower core layers in the pole tip region. The method comprises laminating an insulating layer on the lower core layer; providing a trench in the insulating layer to extend it to the outside of the medium-facing surface in the pole tip region and extend from the pole tip region to the back region so that the bottom of the trench reaches the lower core layer; laminating a lower pole layer and the gap layer in the trench to connect the lower core layer and the lower pole layer to each other; forming a back insulating layer on the back region side of the gap layer to define the gap depth position of an upper pole layer; forming the upper pole layer on the pole tip region side of the gap layer so that the upper pole layer has the gap depth defined by the back insulating layer in substantially parallel with the medium-facing surface; forming a coil in the back region; and forming the upper core layer to join it to the upper pole layer in the pole tip region and partially cover the coil in the back region.

The back insulating layer of the present invention preferably comprises an apex surface which is formed in the vicinity of the gap depth by post baking to be inclined so that the thickness increases from the medium-facing surface side to the back region side.

The technique of forming the back insulating layer by using positive a photoresist comprising a novolak resin is selected.

The technique of forming the lower pole layer and the gap layer by electroplating using the lower core layer as an electrode is selected.

The technique of forming the upper pole layer by electroplating using the gap layer as an electrode is selected.

The trench width in the medium-facing surface is preferably set to 1 μm or less.

In the present invention, the insulating layer is laminated on the lower core layer, and the trench is formed in the insulating layer to extend to the outside of the medium-facing surface in the pole tip region and extent from the pole tip region to the back region so that the bottom of the trench reaches the lower core layer, and the lower pole layer, the gap layer and the upper pole layer are formed in the trench, thereby permitting precise setting of the magnetic recording track width. Furthermore, since the back insulating layer comprising a novolak resin or the like is laminated on the back region side of the gap layer, and the upper pole layer comprises a metal or the like which permits electroplating, thereby permitting lamination of the upper pole layer by electroplating using the gap layer as an electrode. The back insulating layer is formed in the back region side of the gap layer to define the gap depth position of the upper pole layer, and thus the upper pole layer having the gap depth defined by the back insulating layer in substantially parallel with the medium-facing surface can be formed on the pole tip region side of the gap layer. There is thus no need to use liftoff resist, and the gap depth position can thus be recognized as viewed in plane, improving the setting precision of the gap depth position. There is also no need to use long throw sputtering having a low lamination rate, thereby improving productivity.

For example, the apex surface is formed in the back insulating layer comprising a novolak resin by post baking. In this case, the gap between the lower and upper core layers in the back region of the trench can be increased without formation of another insulating layer on the back insulating layer, thereby decreasing an internal leakage magnetic field and improving the performance of the magnetic head.

With the lower core layer planarized by polishing, the insulating layer laminated in the subsequent step is planarized, and thus the trench can precisely be formed by anisotropic etching, thereby permitting the magnetic recording track width to be set to a small value.

Furthermore, anisotropic etching for forming the trench permits improvement in the dimensional precision of the trench width to the trench depth without causing side etching.

In forming the trench, preferably, a mask layer is laminated on the insulating layer, and patterned so that portions of the insulating layer, which are exposed from the pattern, are anisotropically etched. The anisotropic etching is most preferably performed by a reactive ion etching method from the viewpoint that the trench can be formed with high dimensional precision.

DESCRIPTION OF THE PREFERRED EMBODIMENT

A thin film magnetic head and a method of producing the same in accordance with a first embodiment of the present invention will be described with reference to the drawings.

Figure 1:
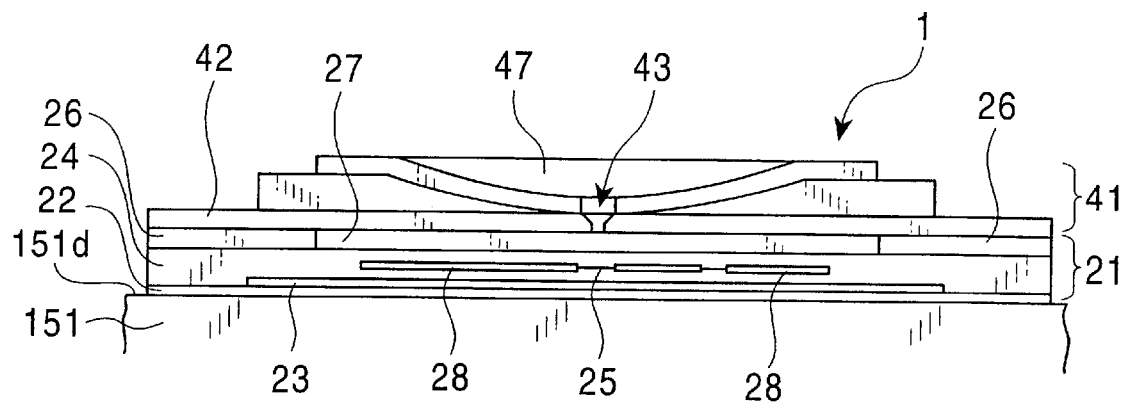
FIG. 1 is a front view showing a combination type thin film magnetic head in accordance with a first embodiment of the present invention.
Figure 2:
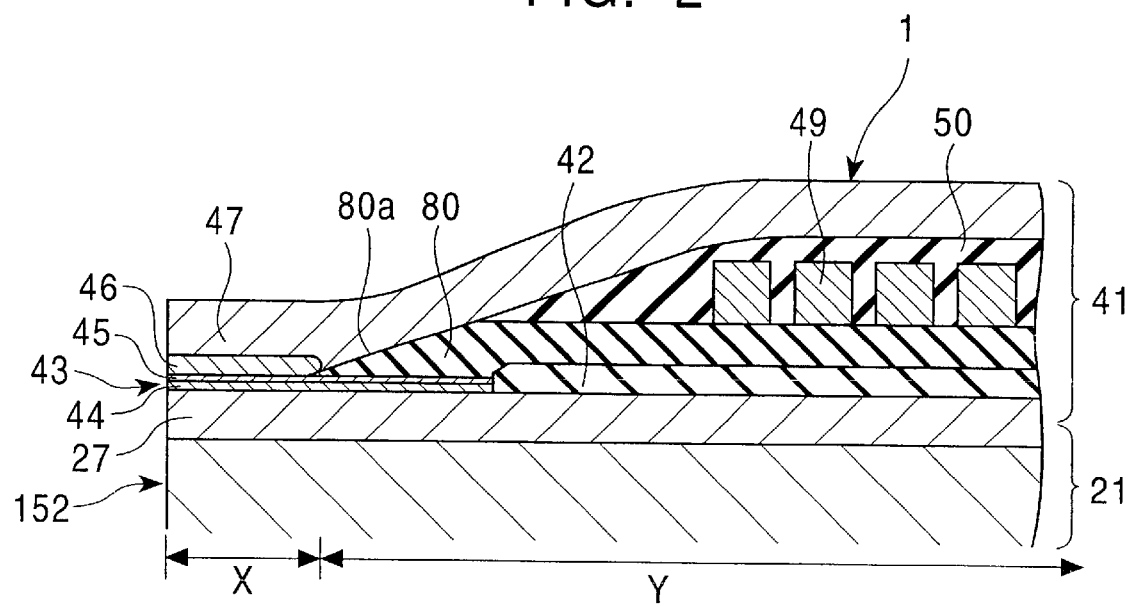
FIG. 2 is a sectional side view showing the thin film magnetic head in accordance with the first embodiment of the present invention.

FIG. 1 is a front view of a combination type thin film magnetic head of this embodiment, and FIG. 2 is a sectional side view of the same.

Figure 33:
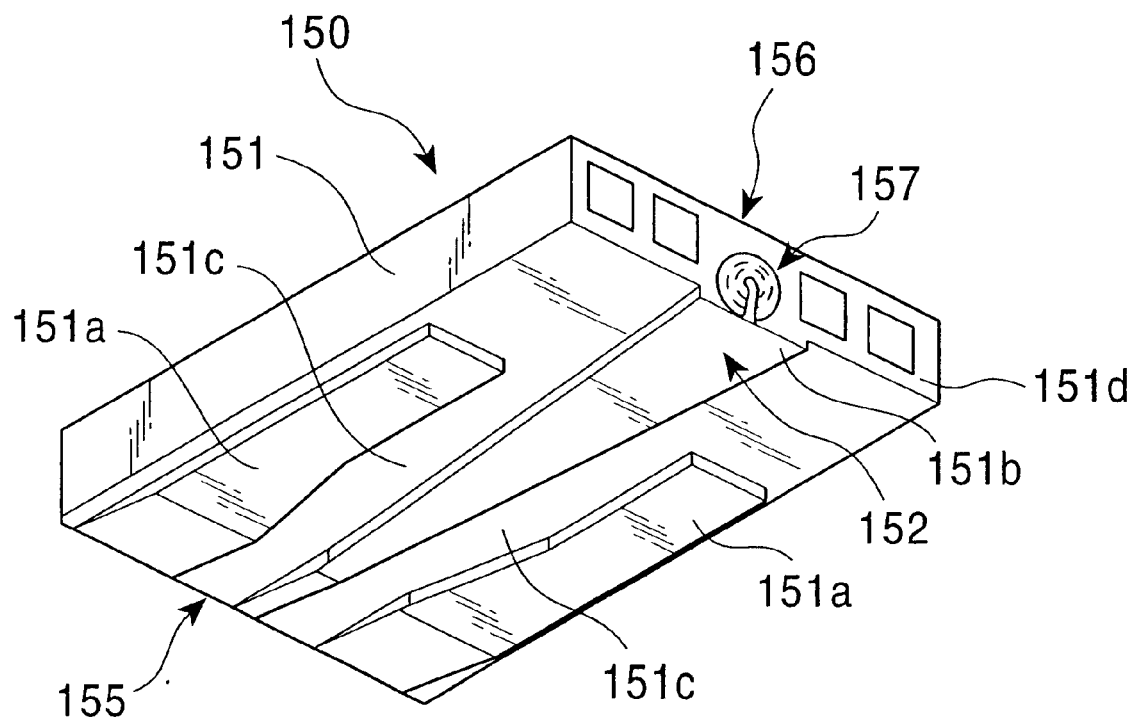
FIG. 33 is a perspective view showing a conventional floating magnetic head.
Figure 34:
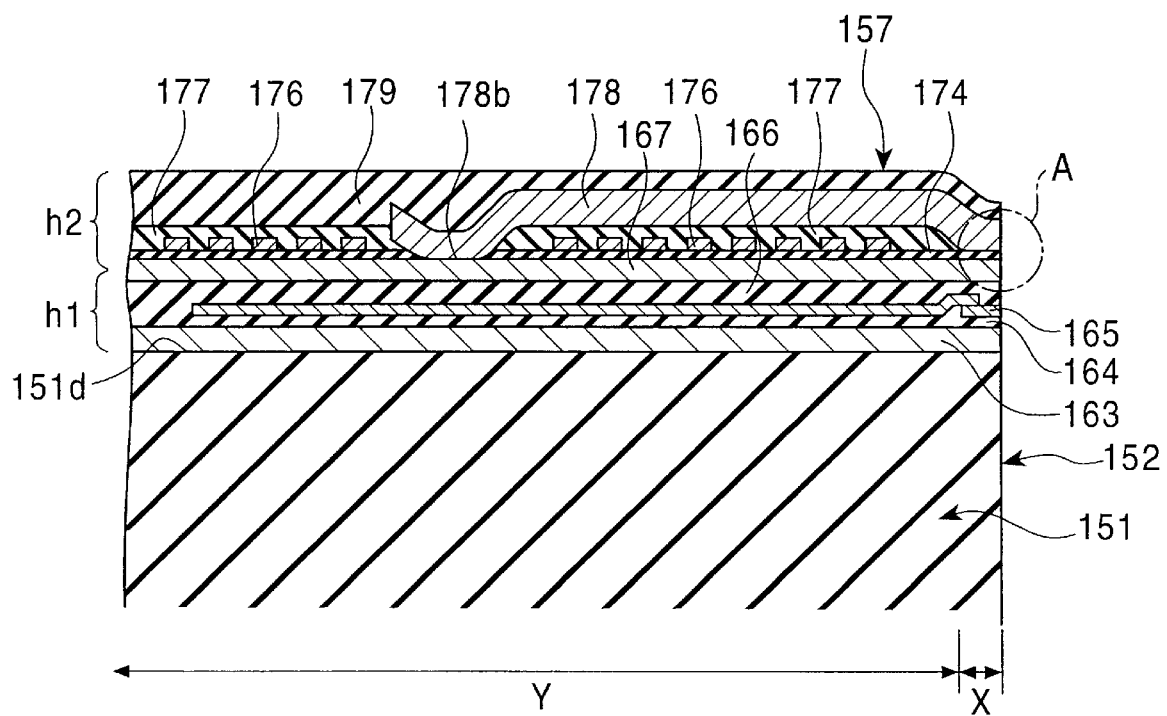
FIG. 34 is a sectional side view showing a conventional combination type thin film magnetic head.
Figure 35:
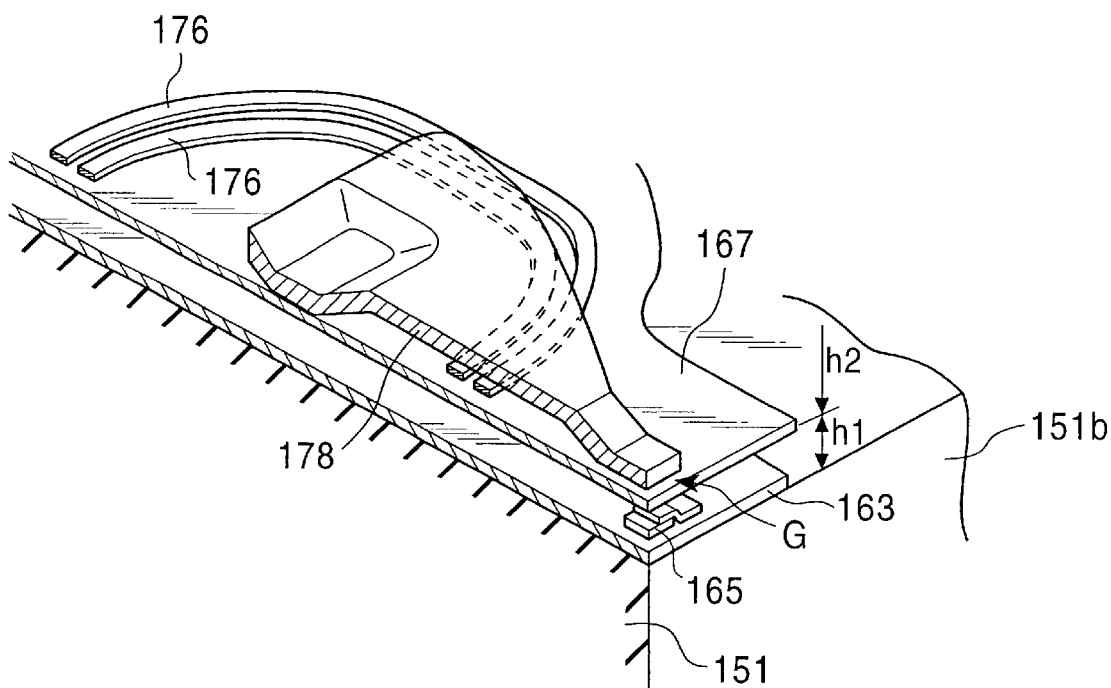
FIG. 35 is a perspective view showing a conventional combination type thin film magnetic head.

In these drawings, the same components as those shown in FIGS. 33 to 35 are denoted by the same reference numerals, and the description thereof is omitted.

Referring to FIG. 1, a combination type thin film magnetic head 1 of this embodiment comprises a read head (MR magnetic head or GMR magnetic head) 21 comprising a magnetoresistive element, and an inductive head (write head) 41, both of which are laminated on the side surface 151d of a slider 151.

As shown in FIG. 1, the read head 21 comprises an insulating layer 22 formed on the end surface 151d of the slider 151, a lower shielding layer 23 laminated on the insulating layer 22 and made of a magnetic alloy, a read gap layer 24 laminated on the lower shielding layer 23, a magnetoresistive element 25 embedded in the read gap layer 24 and partially exposed from the medium-facing surface, a planarizing insulating layer 26 laminated on the read gap layer 24, and an upper shielding layer 27 embedded in the planarizing insulating layer 26. The upper shielding layer 27 is also used as a lower core layer of the write head 41. The upper shielding layer (lower core layer) 27 is preferably made of a soft magnetic alloy such as a FeNi alloy, a FeCoNi alloy, or the like.

The end surface of each of the lower shielding layer 23, the read gap layer 24, the planarizing insulating layer 26, the upper shielding layer 27 and the magnetoresistive element 25 is exposed from the medium-facing surface 152 side.

Furthermore, electrode layers 28 are connected to the magnetoresistive element 25, for supplying a sensing current.

Examples of the magnetoresistive element 25 include a magnetoresistive element comprising a soft magnetic material having magnetoresistance, and a so-called giant magnetoresistive element (GMR element).

In the reading magnetic head 21, a small leakage magnetic field from a magnetic recording medium is applied to the magnetoresistive element 25 to cause a change in resistance of the magnetoresistive element 25 so that a voltage change based on the change in resistance is read as a reproduction signal of the magnetic recording medium.

Figure 3:
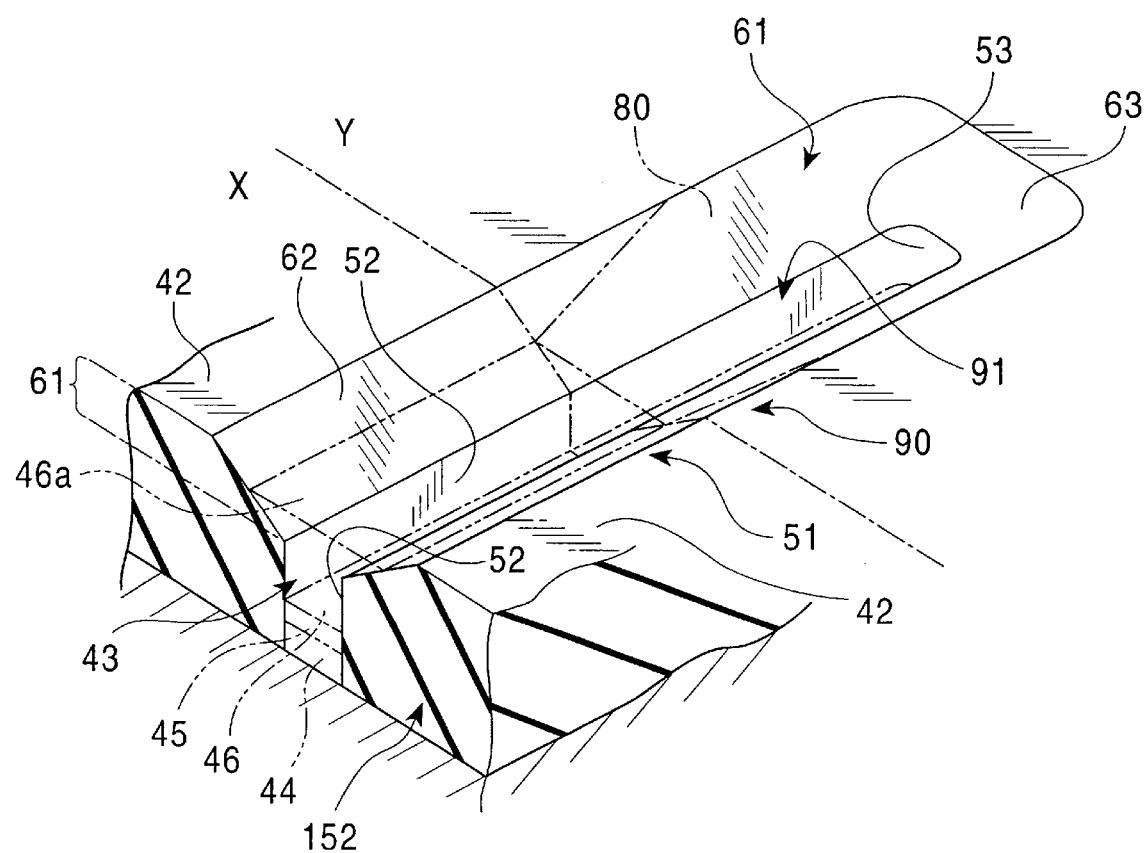
FIG. 3 is a perspective view showing a trench and a principal portion of a pole tip region of the thin film magnetic head in accordance with the first embodiment of the present invention.
Figure 4:
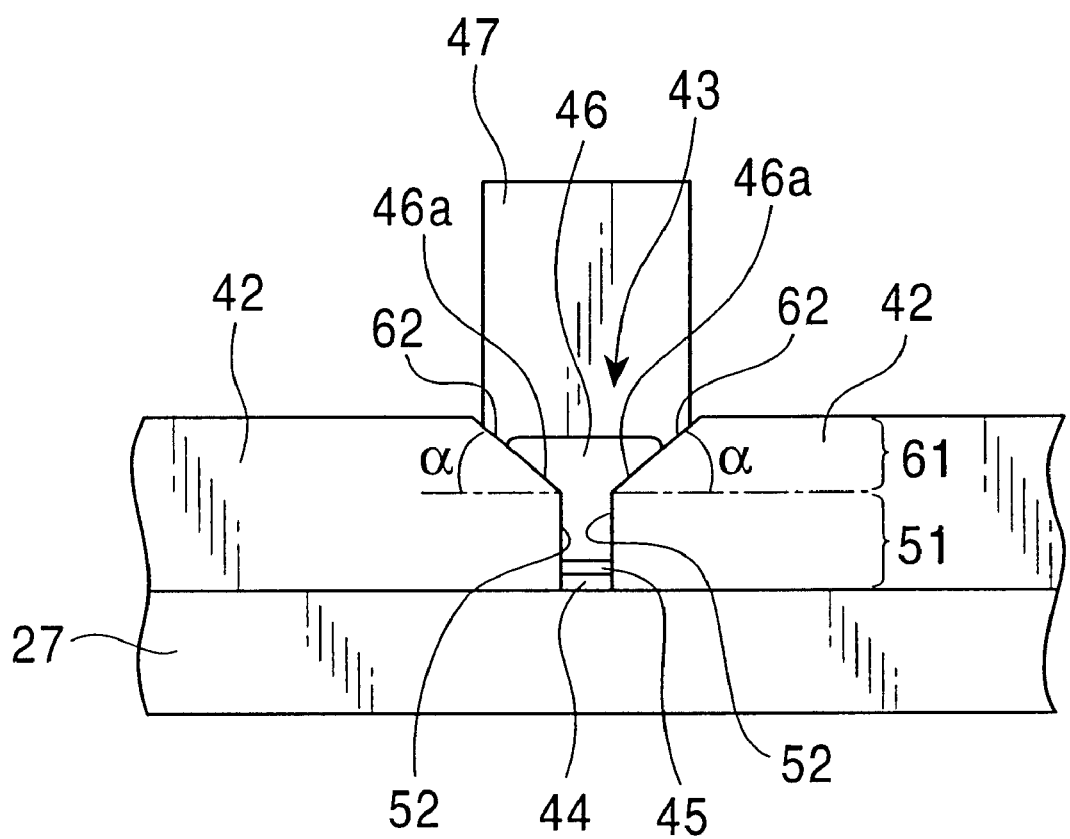
FIG. 4 is a front view showing the principal portion of the pole tip region of the combination type thin film magnetic head in accordance with the first embodiment of the present invention.
Figure 5:
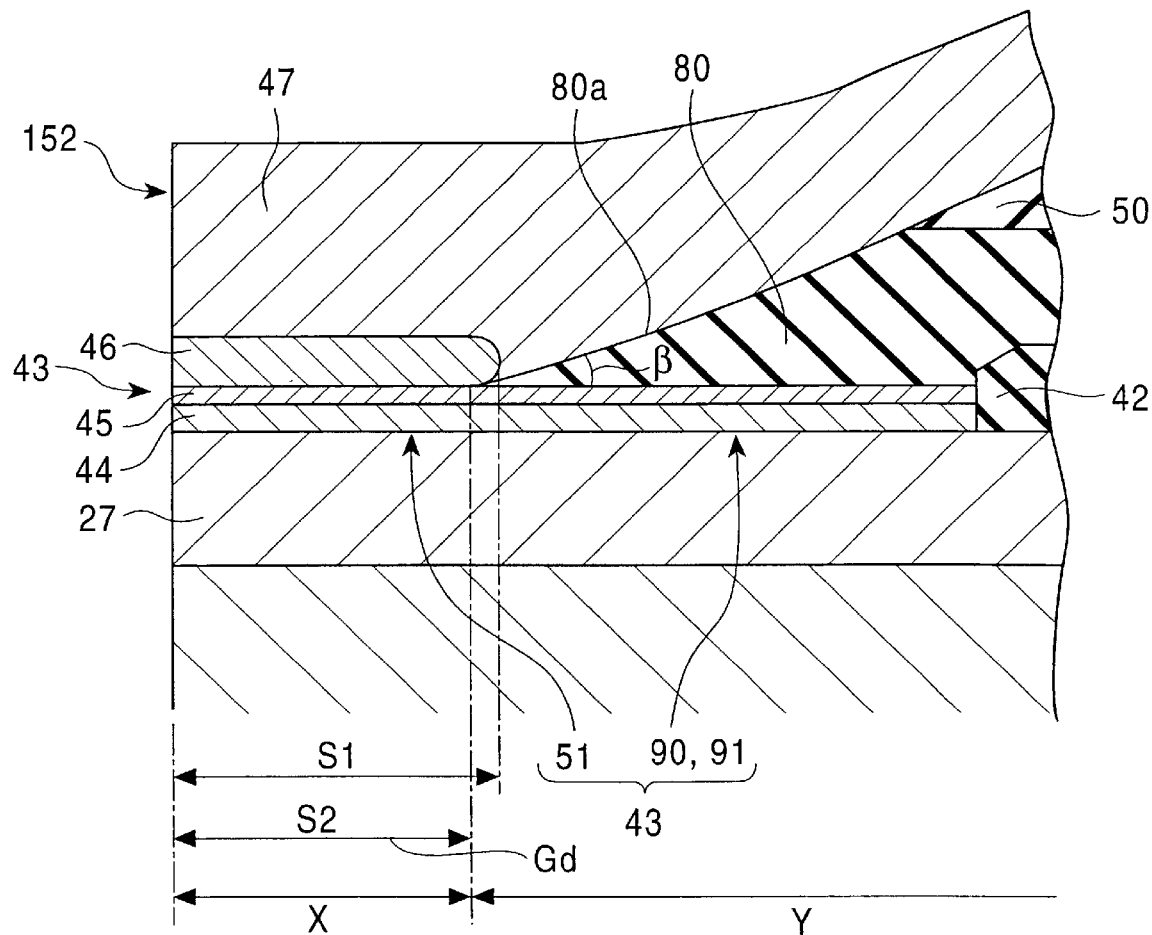
FIG. 5 is a sectional side view showing the principal portion of the pole tip region of the combination type thin film magnetic head in accordance with the first embodiment of the present invention.

FIG. 2 is a sectional side view showing the thin film magnetic head of this embodiment, FIG. 3 is a perspective view showing a trench 43 and a principal portion of a pole tip region of the thin film magnetic head of this embodiment, and FIGS. 4 and 5 are a front view and an enlarged sectional side view thereof, respectively.

As shown in FIGS. 1 to 5, the write head 41 of this embodiment comprises an insulating layer 42 laminated on the lower core layer (upper shielding layer) 27, the trench 43 provided in the insulating layer 42 to extent from the medium-facing surface 152 in the pole tip region X to the back region Y, and a lower pole layer 44, a gap layer 45, an upper pole layer 46 and a back insulating layer 80 which are laminated in the trench 43 so that the lower pole layer 44 is connected to the lower core layer 27, and the upper pole layer 46 connected to an upper core layer 47. The upper pole layer 46 and lower pole layer 44 constitute the upper pole tip and lower pole tip, respectively.

As shown in FIG. 2, the upper core layer 47 and the lower core layer 27 extend from the back region Y to the pole tip region X so that the end surfaces thereof are exposed from the medium-facing surface 152. The upper core layer 47 and the lower core layer 27 are magnetically connected to each other in the back region Y.

The back insulating layer 80 is located on the back region Y side of the gap layer 45, and on the back region Y side of the insulating layer 42.

As shown in FIG. 2, the pole tip region X means the region where the upper core layer 47 and the lower core layer 27 are opposed to each other with the gap layer 45 held therebetween in the vicinity of the medium-facing surface 152, and the back region Y means the region excluding the pole tip region.

The trench 43 comprises a trench main body 51 formed in the pole tip region X adjacent to the lower core layer 27 to have a sectional shape having the same dimensions as an opening formed in the medium-facing surface 152, and a trench continuing portion 90 formed in the back region Y adjacent to the lower core layer 27 to be continued from the trench main body 51. In the trench main body 51 and the trench continuing portion 90, an inclined portion 61 is continuously formed on the upper core layer 47 side.

The trench continuing portion 90 comprises a trench extending portion 91 which has the same sectional dimensions as the trench main body 51, and which extends to the back region Y.

In the trench main body 51 and the trench extending portion 91, two parallel side walls 52 are provided to stand in substantially parallel on the lower core layer 27 and reach the medium-facing surface 152. The two parallel side walls 52 are connected by the end surface 53 substantially parallel to the medium-facing surface 152, located at the penetralia of the trench extending portion 91 in the back region Y, and having substantially circular curved corners which connect with the parallel side walls 52.

The inclined portion 61 is comparted into at least two side wall inclined surfaces 62 which are respectively connected to the parallel side walls 52 and outwardly inclined in the width direction of the trench extending portion 91, and an end inclined surface 63 connected to the end surface 53 and inclined to the back region Y side.

The lower pole layer 44 and the gap layer 45 are laminated in the trench main body 51 and the trench extending portion 91 so that the lower pole layer 44 is connected to the lower core layer 27.

The upper pole layer 46 is laminated in the trench main body 51 in the pole tip region X to extent to the inclined portion 61 so that the upper pole layer 46 is connected to the upper core layer 47. The gap depth Gd is defined by the back region Y side end of the upper pole layer 46.

The lower core layer 27 and the lower pole layer 44 form the lower core, and the upper core layer 47 and the upper pole layer 46 form the upper core. The lower pole layer 44, the gap layer 45 and the upper pole layer 46 form the magnetic gap which is interposed between the upper and lower cores.

The back insulating layer 80 is made of a positive photoresist comprising a novolak resin or the like. The back insulating layer 80 is laminated on the back region Y side of the gap layer 45 in the trench extending portion 91, and comprises an apex surface 80a which is inclined so that the thickness thereof increases from the medium-facing surface 152 to the back region Y.

The insulating layer 42, the lower pole layer 44, the gap layer 45 and the upper pole layer 46 are exposed from the medium-facing surface 152 in the vicinity of the gap.

In the above-mentioned construction, since the magnetic recording track width in the medium-facing surface 152 coincides with the width of the trench 43, the magnetic recording track width can be decreased if the formation precision of the width of the trench 43 is improved. Also the magnetic gap is exposed from the medium-facing surface 152, and thus magnetic recording on the magnetic recording medium can be efficiently performed by a leakage magnetic field from the magnetic gap.

In the thin film magnetic head 41 of the present invention, a portion of the lower pole layer 44, the gap layer 45 and the upper pole layer 46 are laminated in the previously formed trench main body 51 to form the magnetic gap, and thus the magnetic recording track width is determined by the width of the trench main body 51. Therefore, the width of the magnetic gap can be decreased by decreasing the width of the trench main body 51.

Where the width of the trench main body 51 is 1 μm or less, preferably 0.5 μm or less, the magnetic recording track width can be set to 1 μm or less.

In the thin film magnetic head 41 of the present invention, the gap depth Gd of the magnetic gap is defined by the distance from the medium-facing surface 152 to the tip of the back insulating layer 80, thereby causing no variation in setting the gap depth Gd.

In the thin film magnetic head 41 of the present invention, as shown in FIGS. 3 and 4, the upper pole layer 46 is laminated in the trench main body 51 to extend to the inclined portion 61 and to be connected to the upper core layer 47, thereby forming a taper portion 46a on the upper core layer 47 side of the upper pole layer 46 and a taper portion on the upper pole layer 46 side of the upper core layer 47. The presence of these paper portions causes a smooth magnetic flux flow along the taper portions between the upper core layer 47 and the upper pole layer 46, thereby preventing a leakage magnetic flux to the peripheral region.

Similarly, in the thin film magnetic head 41, as shown in FIG. 5, the apex surface 80a is formed in the back insulating layer 80 to form a taper portion on the apex surface 80a side of the upper core layer 47. The presence of the apex surface 80a and the taper portion causes a smooth magnetic flux flow in the boundary between the upper core layer 47 and the upper pole layer 46, thereby preventing a leakage magnetic flux flow to the peripheral region in the connection portion between the upper core layer 47 and the upper pole layer 46.

As shown in FIG. 4, the inclination angle a of the side wall inclined surfaces 62 is preferably in the range of 10 to 80° with respect to the upper side of the lower core layer 27, and the inclination angle β of the apex surface 80a of the back insulating layer 80 is preferably in the range of 10 to 80°, more preferably in the range of 20 to 30°, with the lower core layer 27.

With the side wall inclined surfaces 62 having an inclination angle α of less then 10°, the reactance between the upper core layer 47 and the lower core layer 27 is decreased to increase a leakage magnetic field from the upper core layer 47 to the upper pole layer 46 in the vicinity of the apex surface 80a near the back end of the magnetic gap, thereby undesirably deteriorating recording efficiency. With an inclination angle of over 80°, the upper core layer 47 cannot be inevitably formed to have a smooth sectional shape, and thus the upper core layer 47 has a partially acute sectional shape, increasing a demagnetizing field in the vicinity of the acute portion. Therefore, the reactance at the tip of the upper core layer 47 is increased, and the recording efficiency undesirably deteriorates.

With the apex surface 80a having an inclination angle β in the range of 20 to 30°, the O/W performance (overwrite performance) can be further improved.

As shown in FIG. 2, a coil 49 is formed on the back insulating layer 80, and an upper insulating layer 50 is laminated to cover the back insulating layer 80 and the coil 49.

The coil 49 is spirally patterned in plane in the back insulating layer 80.

The upper core layer 47 is formed to cover the upper pole layer 46, the apex surface 80a of the back insulating layer 80, and the upper insulating layer 50, and cover the coil 49 with the upper insulating layer 50 provided therebetween.

The insulating layer 42 is preferably made of any one of AlO, Al$_2$O$_3$, SiO, SiO$_2$, Ta$_2$O$_5$, TiO, AlN, AlSiN, TiN, SiN, Si$_3$N$_4$, NiO, WO, WO$_3$, BN, and CrN, and it may comprise a single layer film or multilayer films. With the insulating layer 42 comprising the above material, the trench 43 can be formed by anisotropic etching without side etching, thereby improving the dimensional precision of the trench width to the trench depth.

The gap layer 45 is preferably made of at least one of Au, Pt, Rh, Pd, Ru, Cr, NiMo alloys, NiW alloys, NiP alloys and NiPd alloys, and may comprise a single layer film or multilayer films. These materials are nonmagnetic materials which are not magnetized, and are optimum for forming the gap layer of the thin film magnetic head. These materials are also metallic materials, and can be laminated in the trench 43 by electroplating using the lower core layer 27 as an electrode. Therefore, in the portion where the upper pole layer 46 is laminated, the gap layer 45 can securely be formed in the trench main body 51 of the trench 43. It is also possible that the width of the gap layer 45 coincides with the width of the trench main body 51, and the gap layer is used as an electrode for electroplating for forming the upper pole layer 46.

The lower pole layer 44 is preferably made of any one of FeNi alloys, FeNi alloys containing Fe at a higher concentration than Ni, and CoFeNi alloys, and may comprise a single layer film or multilayer films. These materials are magnetic materials having excellent soft magnetic properties, and are optimum for forming the core of the thin film magnetic head. These materials are also metallic materials and can thus be laminated in the trench 43 by electroplating using the lower core layer 27 as an electrode.

The lower pole layer 44 and the gap layer 45 are formed to cover the bottoms of the trench main body 51 and the trench extending portion 91.

The upper pole layer 46 is preferably made of any one of FeNi alloys, FeNi alloys containing Fe at a higher concentration than Ni, and CoFeNi alloys, and may comprise a single layer film or multilayer films. These materials are magnetic materials having excellent soft magnetic properties, and are optimum for forming the core of the thin film magnetic head. These materials are also metallic materials and can thus be laminated in the trench 43 by electroplating using the gap layer 45 as an electrode.

As shown in FIG. 5, the upper pole layer 46 is formed so that the length S1 from the medium-facing surface 152 to the back insulating layer 80 in the portion of the upper pole layer 46, which contacts the upper core layer 47, is larger than the length S2 from the medium-facing surface 152 to the back insulating layer 80 in the portion of the upper pole layer 46, which contacts the gap layer 45.

In the above-described thin film magnetic head 41, a recording current is supplied to the coil 49 to produce a magnetic field in the upper core layer 47 and the lower core layer 27 due to the recording current. Furthermore, the magnetic field is applied to the upper pole layer 46 and the lower pole layer 44, and leaks outward from the gap layer 45 to produce a leakage magnetic field, thereby recording a record signal by magnetization of the magnetic recording medium due to the leakage magnetic field.

The method of producing the thin film magnetic head of the present invention will be described.

The method of producing the thin film magnetic head of the present invention is described later in detail with reference to FIGS. 6 to 24. However, in brief, the method comprises polishing the upper side of the lower core layer 27 to planarize it, laminating the insulating layer 42 on the lower core layer 27, forming the trench 43 in the insulating layer 42 to extent it from the pole tip region X to the back region Y and extent to the outside of the medium-facing surface 152 in the pole tip region X, laminating the lower pole layer 44 and the gap layer 45 to connect the lower pole layer 44 to the lower core layer 27, laminating the back insulating layer 80 to set the gap depth Gd, laminating the upper pole layer 46, and then forming the upper core layer 47 which is connected to the upper pole layer 46, the coil 49 and the upper insulating layer 50.

Figure 6:
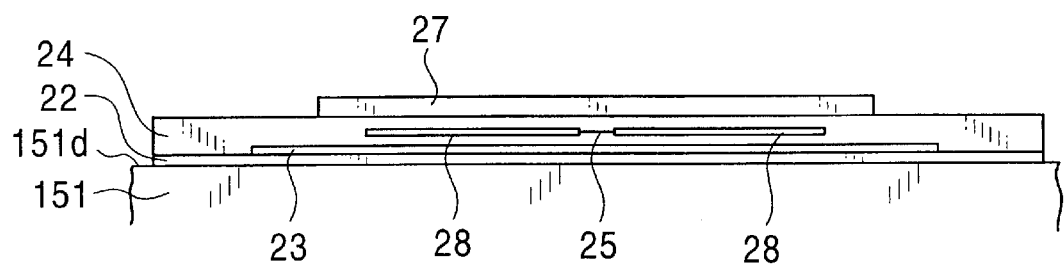
FIG. 6 is a front view illustrating a method of producing the combination type thin film magnetic head in accordance with the first embodiment of the present invention.

In further detail, the substrate insulating layer 22, the lower shielding layer 23, the magnetoresistive element 25, the electrodes 28, and the reading gap layer 24 are first formed in turn on the end surface 151d of the slider 151, as shown in FIG. 6. Then, the lower core layer (upper shielding layer) 27 is formed on the read gap layer 24.

Figure 7:
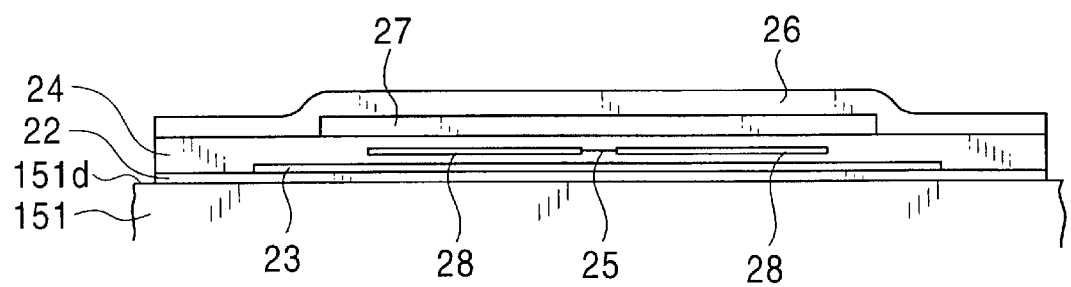
FIG. 7 is a front view illustrating the method of producing the combination type thin film magnetic head in accordance with the first embodiment of the present invention.

Next, the planarizing insulating layer 26 is formed to cover the reading gap layer 24 and the lower core layer 27, as shown in FIG. 7.

Figure 8:
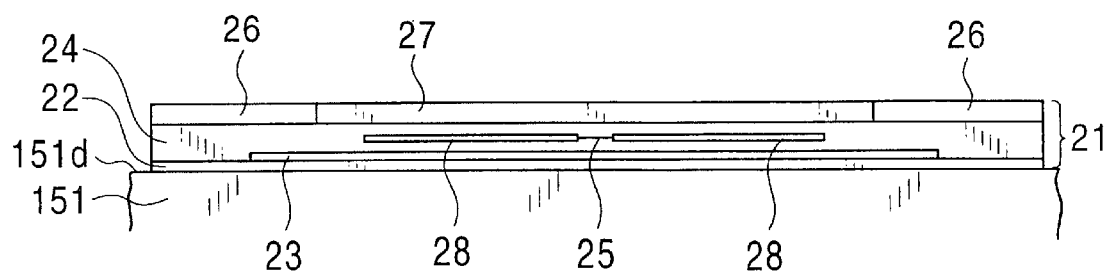
FIG. 8 is a front view illustrating the method of producing the combination type thin film magnetic head in accordance with the first embodiment of the present invention.

Next, the upper side of the planarizing insulating layer 26 is polished to expose the upper side 27a of the lower core layer 27, and the upper side 27a is planarized, as shown in FIG. 8. The polishing can be performed by so-called CMP (chemical mechanical polishing).

The upper side 27a preferably has flatness as a surface roughness Ra in the range of 0.0005 to 0.01 µm.

At this time, the read magnetic head 21 is completed.

The reason why the upper side 27a of the lower core layer 27 is planarized by polishing is that the insulating layer laminated in the subsequent step is also planarized to permit the precise formation of the trench by anisotropic etching, thereby permitting a decrease in the magnetic recording track width.

Figure 9:
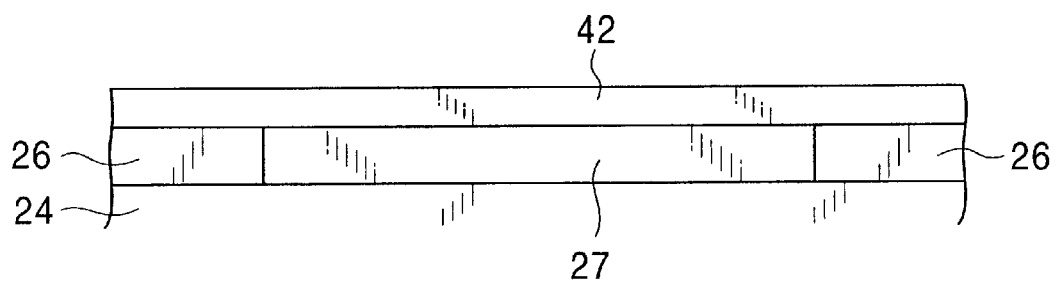
FIG. 9 is a front view illustrating the method of producing the thin film magnetic head in accordance with the first embodiment of the present invention.

Next, the insulating layer 42 is laminated to cover a portion of the planarizing insulating layer 26 and the lower core layer 27, as shown in FIG. 9. The insulating layer 42 is preferably made of any one of AlO, Al$_2$O$_3$, SiO, SiO$_2$, Ta$_2$O$_5$, TiO, AlN, AlSiN, TiN, SiN, Si$_3$N$_4$, NiO, WO, WO$_3$, BN, and CrN, and it may comprise a single layer film or multilayer films. The insulating layer 42 is laminated by means of sputtering, CVD, vapor deposition, or the like, and the thickness thereof is preferably in the range of 0.5 to 2 µm.

Figure 10:
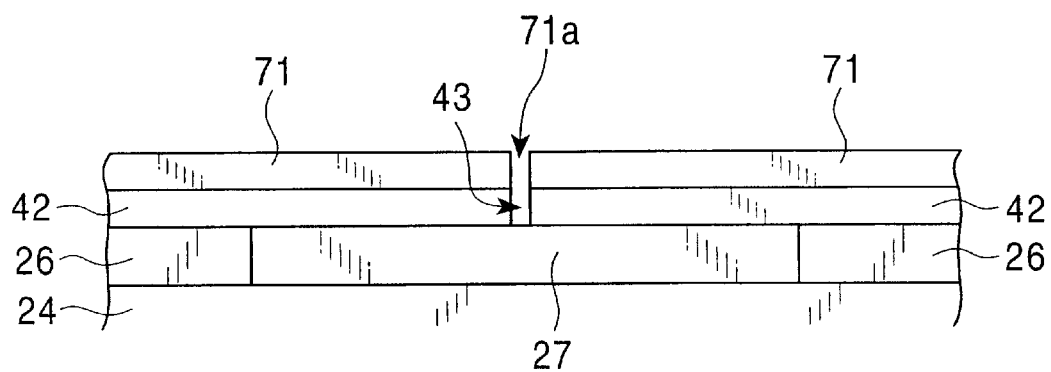
FIG. 10 is a front view illustrating the method of producing the thin film magnetic head in accordance with the first embodiment of the present invention.

Next, a mask layer 71 is formed on the insulating layer 42. and patterned by photolithography to form a pattern 71a so that the portion of the insulating layer exposed from the pattern 71a is anisotropically etched to form the trench 43, as shown in FIG. 10. As the anisotropic etching means, a reactive ion etching process (RIE process) can preferably be used.

The mask layer 71 preferably has a thickness in the range of 0.5 to 4 µm, and comprises any one of a photoresist layer, a metal film layer, a lamination of a photoresist layer and a metal film layer, and a metal oxide layer.

The photoresist layer may comprise ordinary positive or negative photoresist, or photoresist which enables exposure by far ultraviolet rays, electron rays, X rays, ion rays, or the like. The metal film layer is preferably made of at least one of Ti, Zr, Nb, Ta, Cr, Mo, W, Ru, Co, Rh, Ir, Ni, Pd, Pt, Au, Al, In, and Si, and may comprise a single layer film or multilayer films. The metal oxide layer is preferably made of at least one of SiO, $SiO_2$, TaO, $Ta_2O_5$, TiO, SiN, $Si_3N_4$, CrO, WO, ZrO, NiO, AlO, $Al_2O_3$, and IrO, and may comprise a single layer film or multilayer films.

Examples of reactive gases used for forming the trench 43 by the RIE process include $CF_4$, a gas mixture of $CF_4$ and $O_2$, $C_3F_8$, a gas mixture of $C_3F_8$ and $O_2$, $C_4F_8$, a gas mixture of $C_4F_8$ and $O_2$, $C_5F_8$, a gas mixture of $C_5F_8$ and $O_2$, $Cl_2$, $BCl_3$, a gas mixture of $Cl_2$ and $BCl_3$, $CHF_3$, and a mixture of Ar and any one of these gases, and a combination thereof. The reactive gas is appropriately selected from these gases based on the materials of the insulating layer 42 and the mask layer 71.

Figure 11:
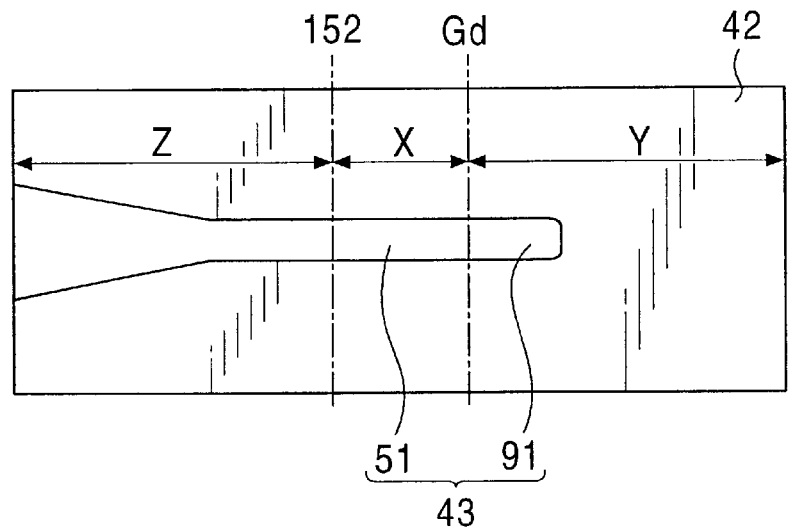
FIG. 11 is a front view illustrating the method of producing the thin film magnetic head in accordance with the first embodiment of the present invention.
Figure 12:
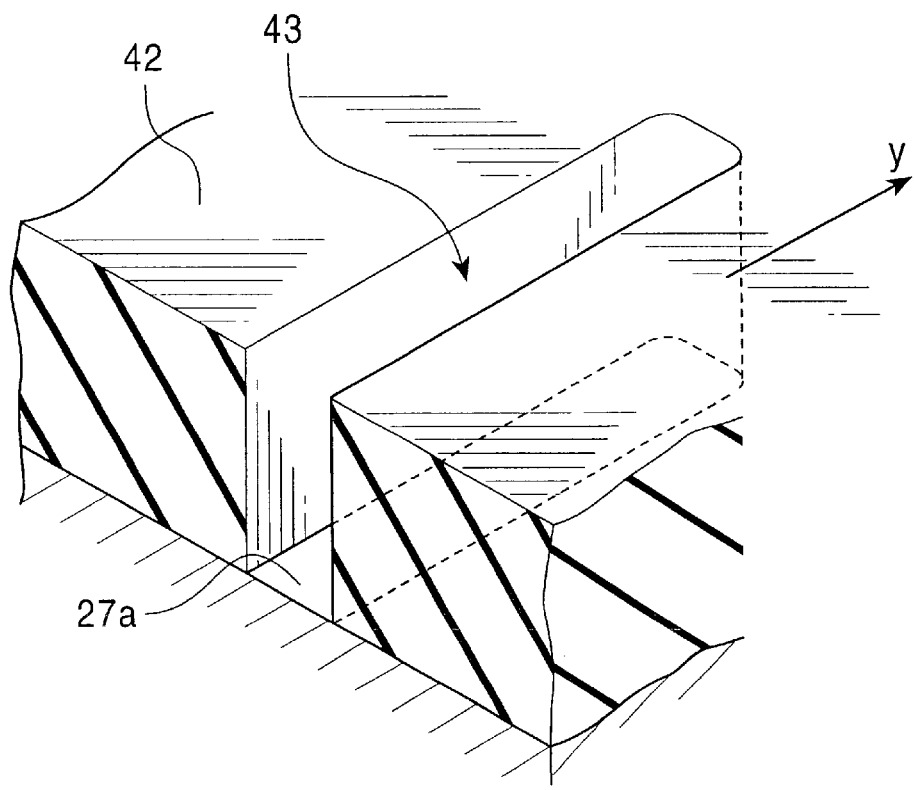
FIG. 12 is a perspective view illustrating the method of producing a thin film magnetic head in accordance with an embodiment of the present invention.

The thus-formed trench 43 is formed to extend to the outside of the medium-facing surface 152 in the pole tip region X, which is shown by Z in FIG. 11, and extend from the medium-facing surface 152 in the pole tip region X to a portion of the back region Y (in the direction of arrow y shown in FIG. 12), so that the upper side 27a of the lower core layer 27 is exposed from the bottom of the trench 43. The width of the trench main body 51 is 1 μm or less, preferably 0.5 μm or less.

Figure 13:
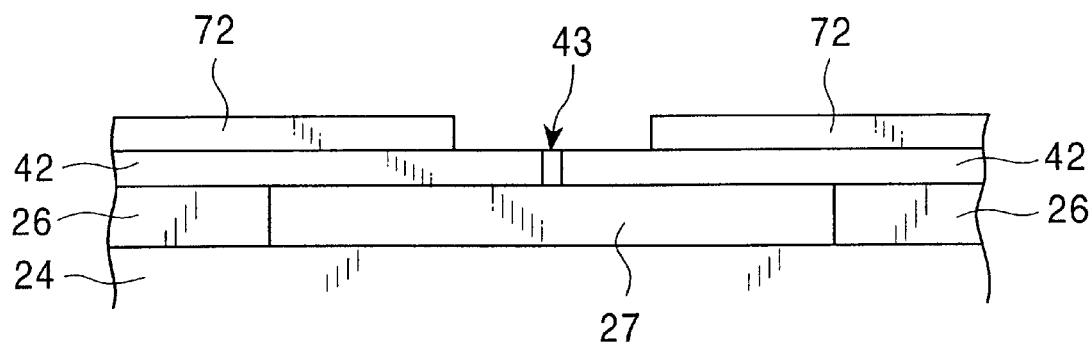
FIG. 13 a front view illustrating the method of producing the thin film magnetic head in accordance with the first embodiment of the present invention.

Next, as shown in FIG. 13, the mask layer 71 is separated, and a new protecting layer 72 is formed. The protecting layer 72 is formed to cover the insulating layer 42 excluding the periphery of the trench 43.

Figure 14:
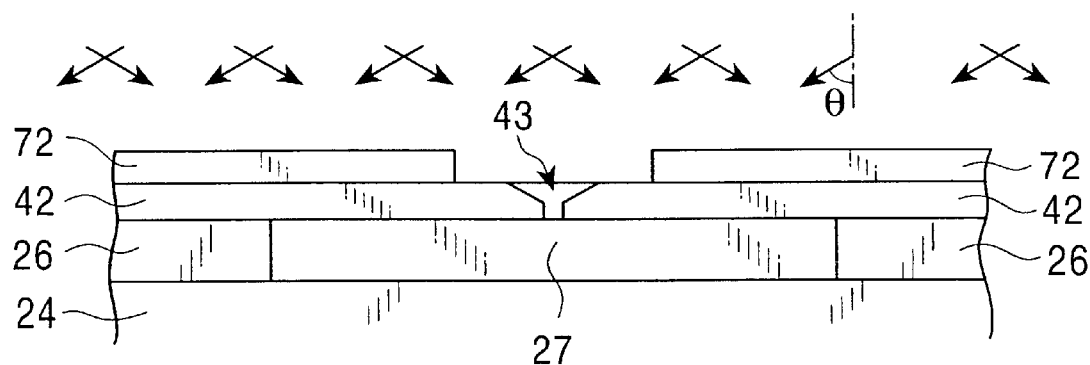
FIG. 14 a front view illustrating the method of producing the thin film magnetic head in accordance with the first embodiment of the present invention.
Figure 15:
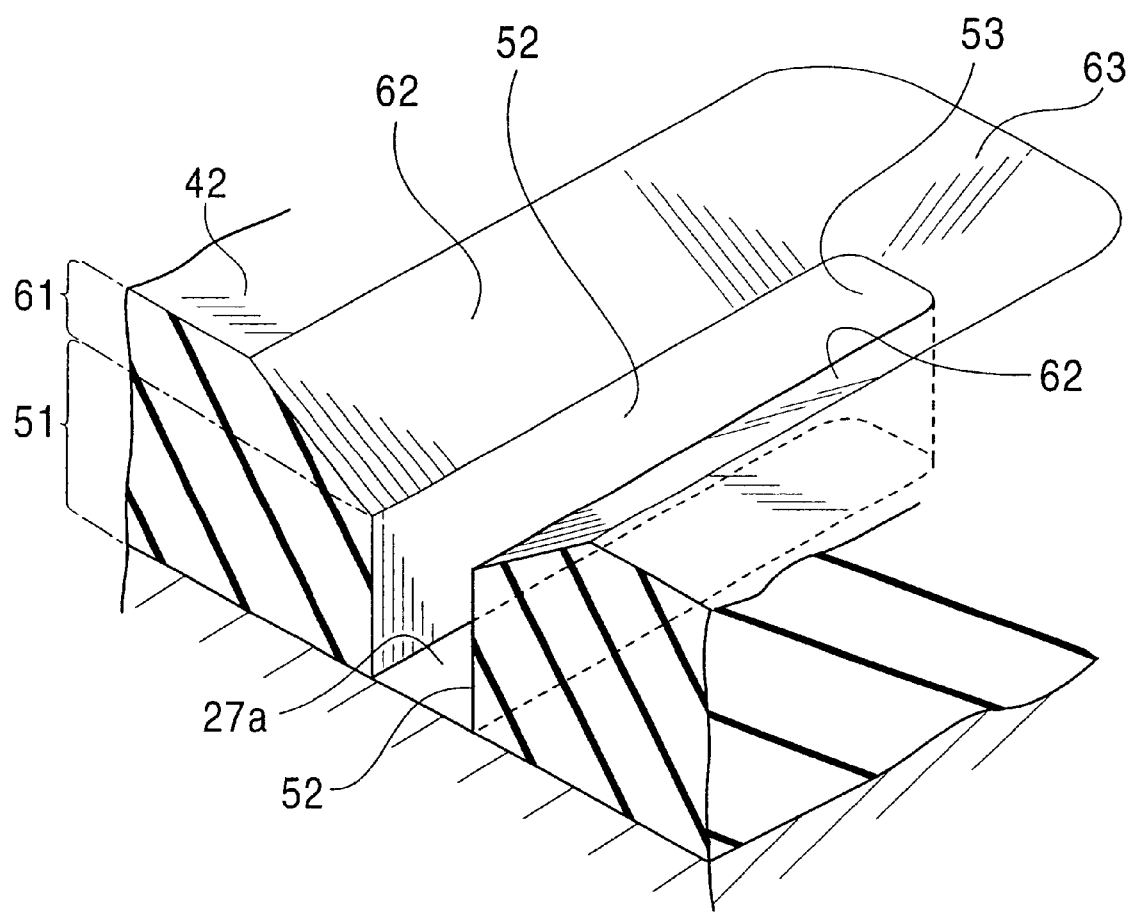
FIG. 15 is a perspective view illustrating the method of producing the thin film magnetic head in accordance with the first embodiment of the present invention.

Next, as shown in FIGS. 14 and 15, the connection portion between the upper side of the insulating layer 42 and the trench 43 is etched by a physical ion beam etching process (an ion milling process using a rare gas such as Ar) to form the side wall inclined surfaces 62 and the end inclined surface 63 in the trench 43.

In etching, the irradiation angle θ of ion beams is in the range of $30° \leq θ \leq 70°$ with respect to the vertical direction of the drawing, and etching is preferably performed with the slider 151 rotated.

The side wall inclined surfaces 62 and the end inclined surface 63 are formed at a predetermined angle with the upper side 27a of the lower core layer 27 due to the interaction between ion beams and the protecting layer 72 formed on the insulating layer 42 excluding the periphery of the trench 43, i.e., a shadow effect.

Alternatively, the trench 43 may be formed after the side wall inclined surfaces 62 are formed.

Figure 16:
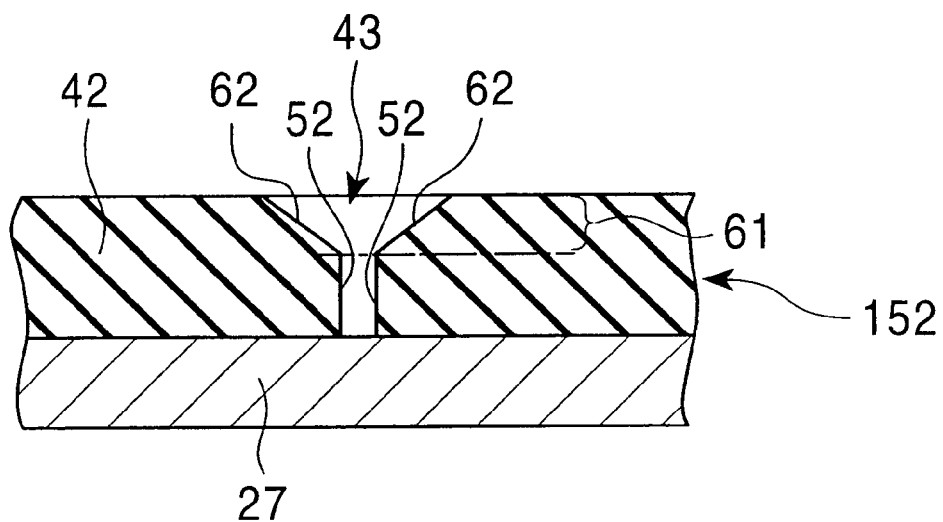
FIG. 16 is a sectional front view illustrating the method of producing the thin film magnetic head in accordance with the first embodiment of the present invention.
Figure 17:
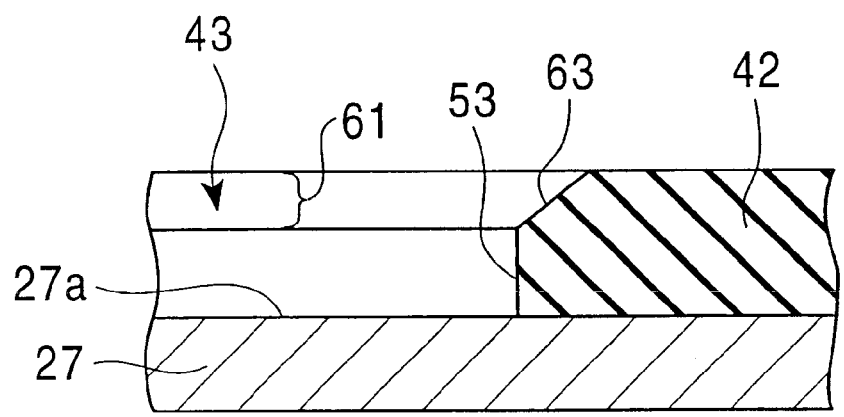
FIG. 17 is a sectional side view illustrating the method of producing the thin film magnetic head in accordance with the first embodiment of the present invention.

In this way, the side wall inclined surface 62 and the end inclined surface 63 are formed to form the trench main body 51 adjacent to the lower core layer 27 and the inclined portion 61 adjacent to the upper side (the upper core layer 27 side) of the insulating layer 42 in the trench 43, as shown in FIGS. 15, 16 and 17.

Figure 18:
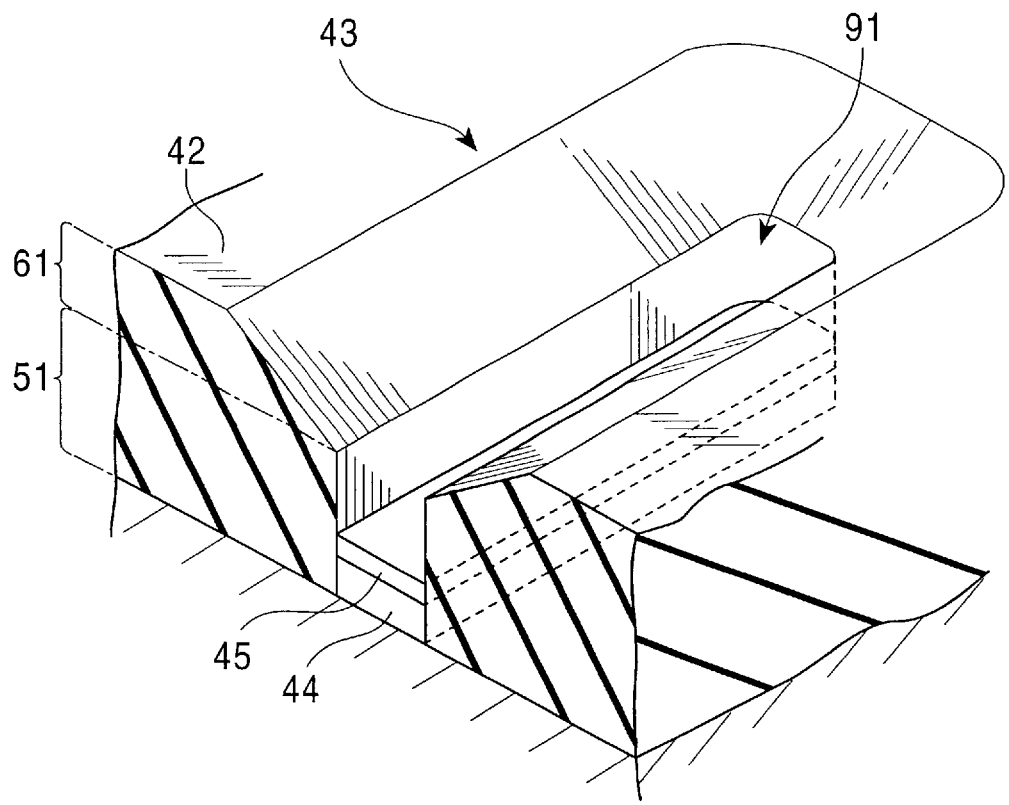
FIG. 18 is a perspective view illustrating the method of producing the thin film magnetic head in accordance with the first embodiment of the present invention.

Next, as shown in FIG. 18, the lower pole layer 44 and the gap layer 45 are formed in the trench 43.

The layers 44 and 45 are preferably formed by a so-called electroplating process (ion plating process) using the lower core layer 27 made of a soft magnetic alloy as an electrode, in which the materials of the layers 44 and 45 are ionized in turn by heating, and the charged particles produced by ionization are deposited by collision with the lower core layer 27 used as an electrode.

Although the lower core layer 27 is mostly covered with the insulating layer 42, the upper side 27a of the lower core layer 27 is exposed from the bottom of the trench 43, as shown in FIG. 17. Therefore, the charged particles are deposited on the exposed upper side of the lower core layer 27 to form the lower pole layer 44, the gap layer 45, and the upper pole layer 46 only in the trench 43.

Specifically, as shown in FIG. 18, the lower pole layer 44 is first laminated on the upper side 27a of the lower core layer 27 by electroplating, and then the gap layer 45 is successively laminated on the lower pole layer 44 by electroplating. At this time, the lower pole layer 44 and the gap layer 45 are formed in the trench main body 51 and the trench extending portion 91 of the trench 43 so that the thicknesses are adjusted to prevent both layers from reaching the inclined portion 61. The thickness of the lower pole layer 44 is 0.1 to 0.5 μm, preferably 0.2 μm. The thickness of the gap layer 45 is 0.10 to 0.40 μm, preferably 0.2 μm.

Figure 19:
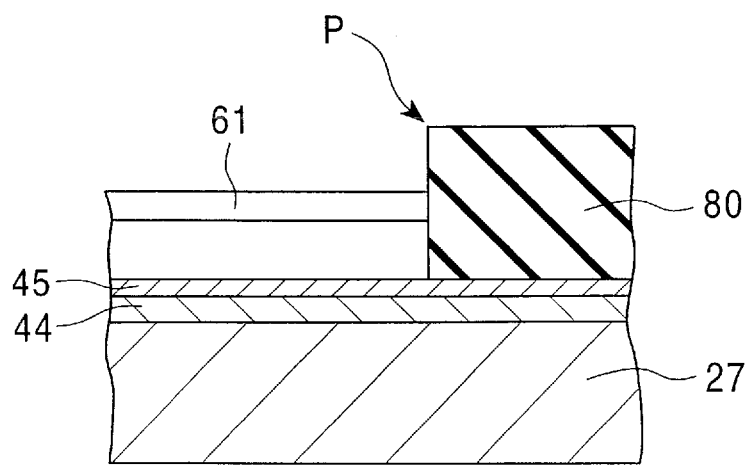
FIG. 19 is a sectional front view illustrating the method of producing the thin film magnetic head in accordance with the first embodiment of the present invention.
Figure 20:
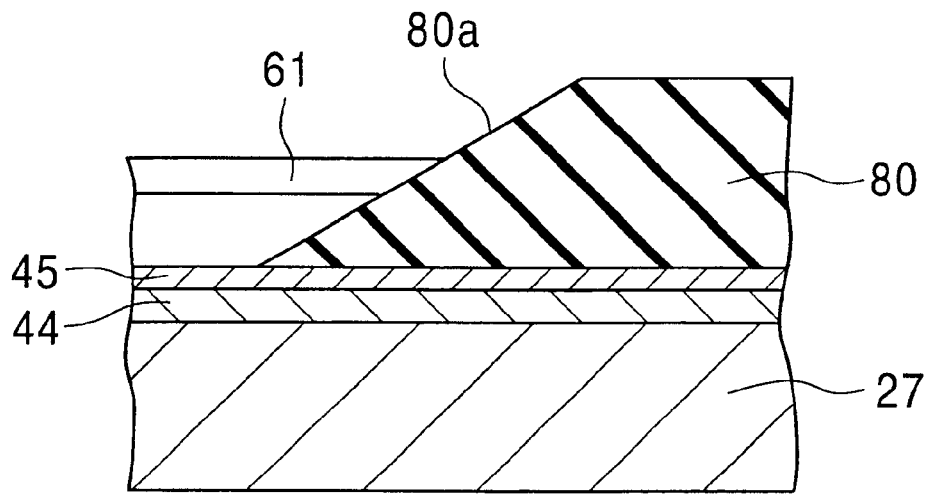
FIG. 20 is a sectional side view illustrating the method of producing the thin film magnetic head in accordance with the first embodiment of the present invention.

Next, the back insulating layer 80 is laminated, as shown in FIGS. 19 and 20.

The back insulating layer 80 comprises a positive photoresist having a composition preferably containing a novolak resin (1) and a quinonediazide compound (2). Examples of the molecular structures of the novolak resin (1) and quinonediazide compound (2) are given below.

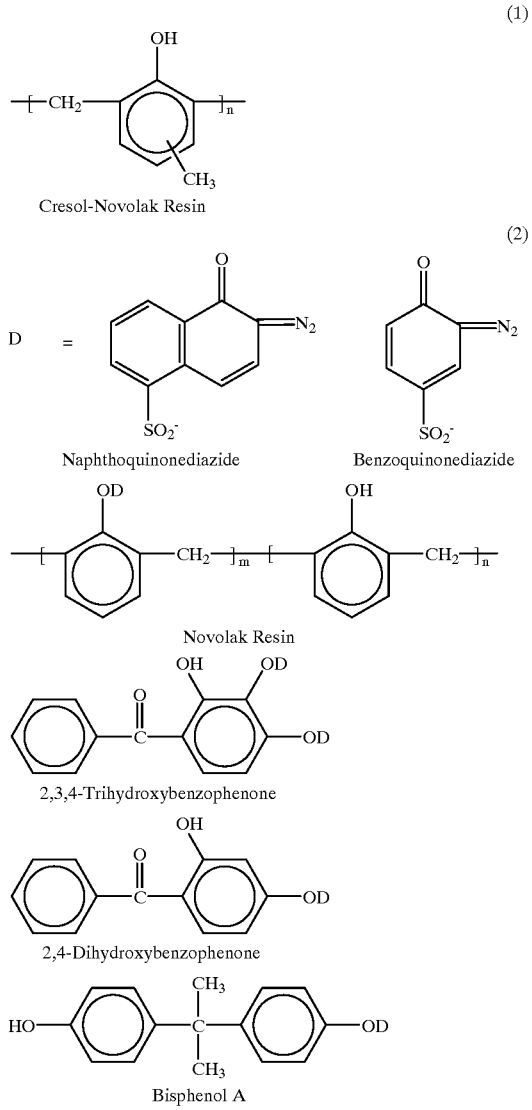

-continued

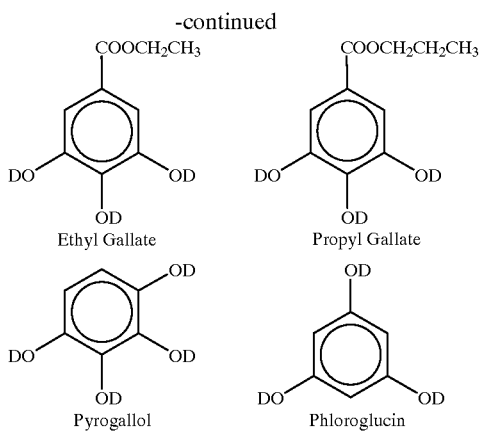

Ethyl Gallate
Propyl Gallate
Pyrogallol
Phloroglucin

For the back insulating layer 80 of this embodiment, for example, a photoresist is selected, which enables the apex angle to be easily controlled by controlling the post baking temperature in the low temperature range of about 90 to 130° C., as described below.

As the material of the back insulating layer 80, any photoresist can be used as long as the apex surface 80a can be formed by post baking in the next step, and photoresist types other than the novolak type can also be used.

The back insulating layer 80 is patterned by photolithography to set the position of the upper pole layer for determining the gap depth Gd, as shown in FIG. 19.

The back insulating layer 80 is subjected to post baking of the edge shown by P in FIG. 19 under heating conditions of 120° C. and 30 minutes, and the resist (the back insulating layer 80) is electrically insulated by discharging the solvent component by UV curing or electron beam irradiation to form the apex surface 80a at the edge P, as shown in FIG. 20.

In this process, the composition of the novolak resin, the resist thickness and the heating conditions of post baking are controlled to set the apex angle β (refer to FIG. 5) of the apex surface 80a with respect to the gap layer 45. For example, with a resist thickness of 2.5 μm and a post baking temperature of 120° C., the apex angle is 25 to 30°, while with a resist thickness of 2.5 μm and a post baking temperature of 100° C., the apex angle is 50 to 60°. In this way, the resist thickness and the heating conditions of post baking can be controlled to increase or decrease the apex angle β.

Figure 21:
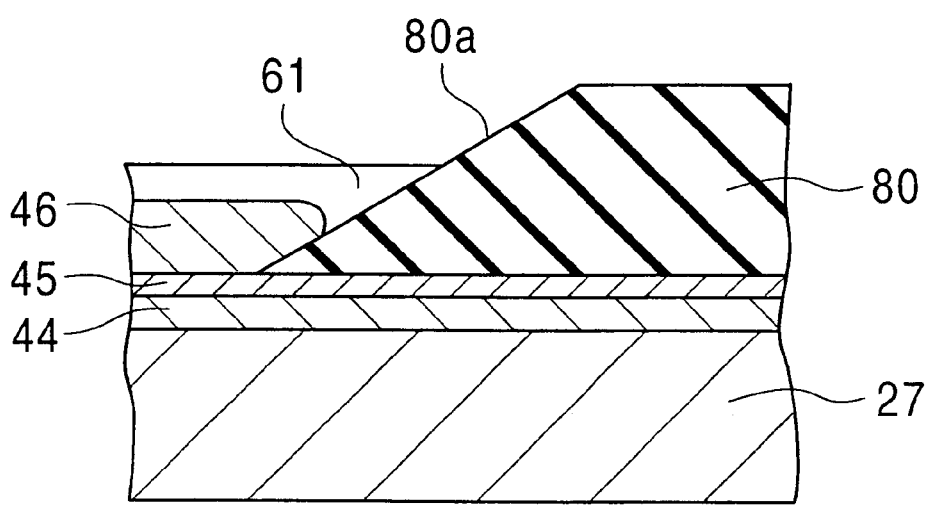
FIG. 21 is a sectional side view illustrating the method of producing the thin film magnetic head in accordance with the first embodiment of the present invention.

Next, the upper pole layer 46 is laminated on the gap layer 45 by electroplating, as shown in FIG. 21.

Although the gap layer 45 is partially covered with the back insulating layer 80 in the back region Y, the upper side of the gap layer 45 is exposed in the trench 43 in the pole tip region X, as shown in FIG. 20. Therefore, the upper pole layer 46 is formed only on the exposed portion of the gap layer 45.

Figure 24:
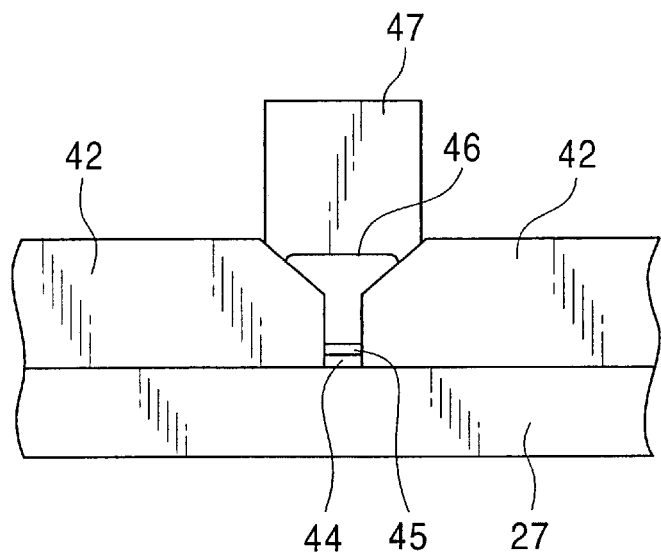
FIG. 24 is a front view illustrating the method of producing a thin film magnetic head in accordance with an embodiment of the present invention.

The upper pole layer 46 is formed so as not to project from the trench 43, as shown in FIGS. 21 and 24. However, a portion of the upper pole layer 46 is preferably located in the inclined portion 61, and the upper pole layer 46 may be formed so that the upper surface thereof and the upper surface of the insulating layer 42 are positioned in substantially the same plane.

In forming the lower pole layer 44, the gap layer 45 and the upper pole layer 46 by electroplating, it is necessary that each of the layers is composed of a metallic material. This is because the use of an insulating material for any one of the layers causes the lamination of an insulating layer, thereby causing difficulties in continuing electroplating.

It is also necessary that each of the lower pole layer 44 and the upper pole layer comprises a soft magnetic material, and the gap layer comprises a nonmagnetic material.

Therefore, each of the lower pole layer 44 and the upper pole layer 46 preferably comprises a single layer film of any one of FeNi alloys, FeNi alloys containing Fe at a higher concentration than Ni, and CoFeNi alloys, or multilayer films thereof. The gap layer 45 preferably comprises a single layer film of any one of Au, Pt, Rh, Pd, Ru, Cr, NiMo alloys, NiW alloys, NiP alloys, and NiPd alloys, or multilayer films thereof.

Figure 22:
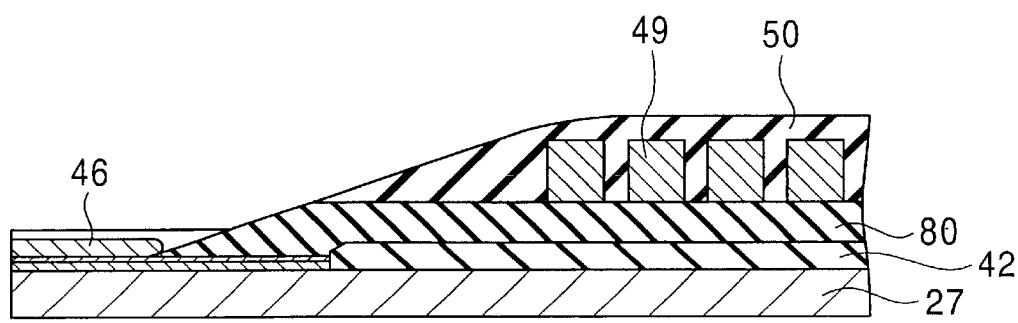
FIG. 22 is a sectional side view illustrating the method of producing the thin film magnetic head in accordance with the first embodiment of the present invention.

Next, the coil 49 is formed on the back insulating layer 80, and the upper insulating layer 50 is laminated to embed the coil 49 therein, as shown in FIG. 22.

Figure 23:
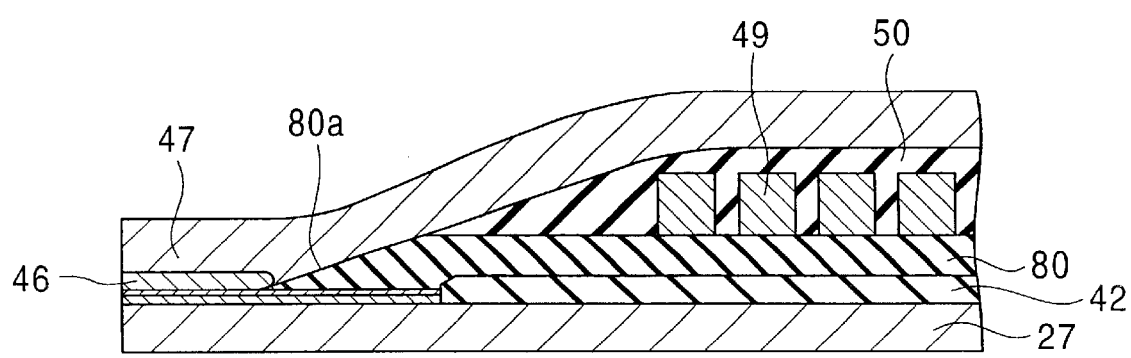
FIG. 23 is a sectional side view illustrating the method of producing the thin film magnetic head in accordance with the first embodiment of the present invention.

Next, the upper core layer 47 is formed to cover the upper pole layer 46, the apex surface 80a of the back insulating layer 80, and the upper insulating layer 50, as shown in FIG. 23.

The upper core layer 47 is preferably formed to completely cover the inside of the trench 43 or cover the upper pole layer 46 so that it substantially contacts the boundary between the upper side of the insulating layer 42 and the trench 43.

Next, cutting at the position of the medium-facing surface 152 is carried out, and the medium-facing surface 152 is polished to produce the thin film magnetic head 41 of the present invention.

In the thin film magnetic head 41, the lower pole layer 44, the gap layer 45, the upper pole layer 46 and the back insulating layer 80 are laminated in the trench 43 to form the magnetic gap, and the lower pole layer 44, the gap layer 45 and the upper pole layer 46 are exposed from the medium-facing surface 152. Therefore, the magnetic recording track width in the medium-facing surface 152 can be caused to coincide with the width of the trench 43 to decrease the magnetic recording track width, and magnetic recording on the magnetic recording medium can be efficiently performed by a leakage magnetic field from the magnetic gap.

The gap depth Gd of the magnetic gap is defined by the distance from the medium-facing surface 152 to the back region Y side end of the upper pole layer 46, and after the trench 43 is formed, the back insulating layer 80 is formed by using positive photoresist, and then subjected to post baking to form the apex surface 80a, so that the gap depth Gd can be set by the end of the upper pole layer 46. Therefore, the gap depth Gd is not defined by the end surface 53 of the trench 43, which has the probability of causing variations, and thus no variation occurs in setting the gap depth Gd, thereby improving the overwrite performance of the write head.

Furthermore, the upper pole layer 46 can be formed by electroplating while maintaining the setting precision of the gap depth Gd, and it is thus possible to shorten the production time, and improve production efficiency, as compared with a conventional method of a thin film magnetic head comprising long throw sputtering using liftoff resist.

In the above-described thin film magnetic head 41, since the apex surface 80a is formed in the back insulating layer 80, the taper portion is formed on the upper pole layer 46 side of the upper core layer 47, and the taper portion 46a is formed on the upper core layer 47 side of the upper pole layer 46. The presence of these taper portions 46a and the apex surface 80a causes a smooth magnetic flux flow between the upper core layer 47 and the upper pole layer 46, and prevents a leakage magnetic flux from the connection portion between the upper core layer 47 and the upper pole layer 46 to unnecessary portions, thereby improving the overwrite performance of the write head.

Because the width of the trench main body 51 is 1 μm or less, preferably 0.5 μm or less, the magnetic recording track width can be set to 1 μm or less.

Furthermore, only the back insulating layer 80 is formed, and another insulating layer need not be formed, thereby simplifying the working process.

A thin film magnetic head and a method of producing the same in accordance with a second embodiment of the present invention will be described with reference to the drawings.

FIGS. 25 to 28 are front views illustrating the method of producing the thin film magnetic head of this embodiment.

In these drawings, substantially the same components as those of the first embodiment shown in FIGS. 1 to 24 are denoted by the same reference numerals, and the description thereof is omitted.

Figure 25:
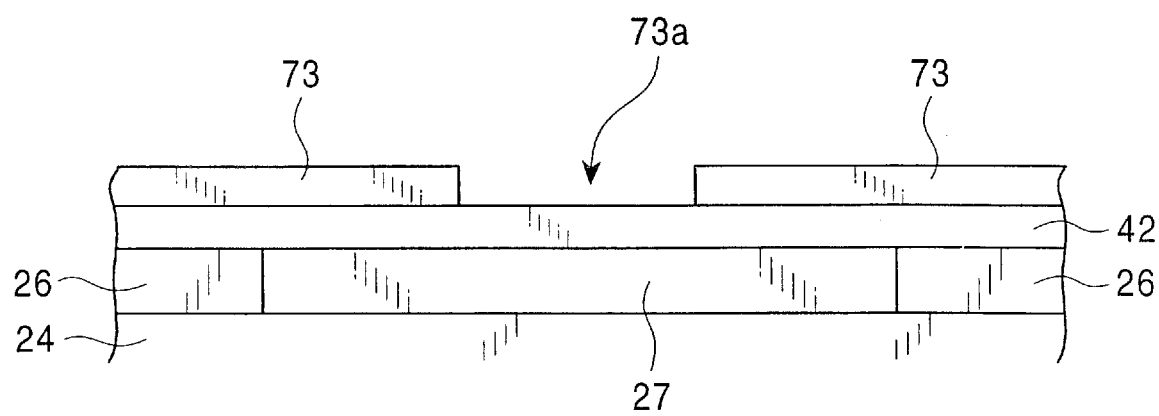
FIG. 25 is a front view illustrating a method of producing a thin film magnetic head in accordance with a second embodiment of the present invention.

In this embodiment, the insulating layer 42 is first laminated in the same manner as the first embodiment shown in FIG. 9, and then a mask layer 73 is formed on the insulating layer 42, as shown in FIG. 25.

The mask layer 73 is then patterned by photolithography to form a pattern 73a so that a portion of the insulating layer 42 exposed from the pattern 73a is etched by reactive ion etching (RIE) to form the trench 43.

The mask layer 73 is preferably formed to a thickness of 1.5 to 3 times the thickness of the insulating layer 42, and etched under RIE conditions in which the etching ratio of the insulating layer 42 to resist (the mask layer 73) is 1 or more.

Figure 26:
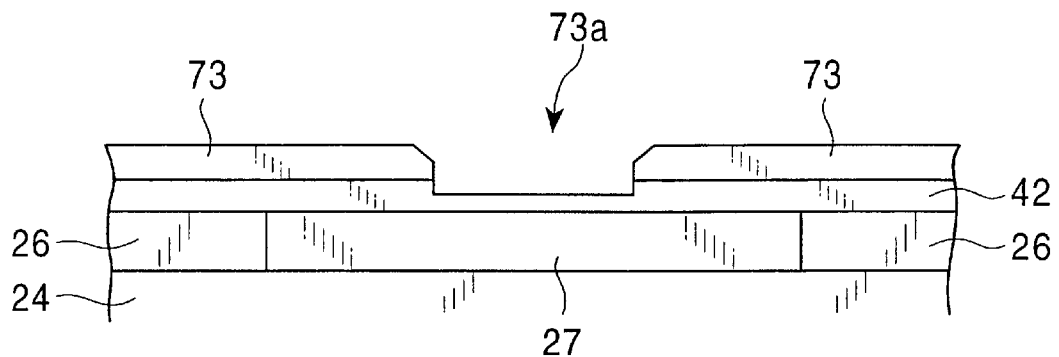
FIG. 26 is a front view illustrating the method of producing the thin film magnetic head in accordance with the second embodiment of the present invention.

First, the portion of the insulating layer 42 which is exposed from the pattern 73a formed in the mask layer 73, and the edge of the pattern 73a of the mask layer 73 are etched by reactive ion etching (RIE) which has lower anisotropy and is closer to anisotropic etching than the first embodiment, as shown in FIG. 26.

Figure 27:
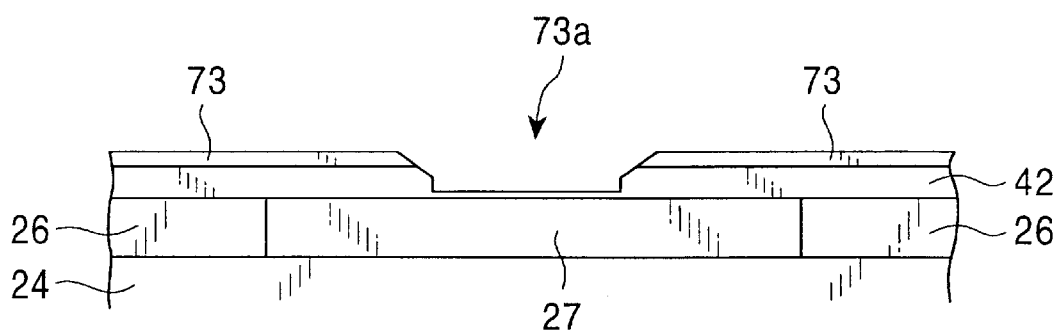
FIG. 27 is a front view illustrating the method of producing the thin film magnetic head in accordance with the second embodiment of the present invention.
Figure 28:
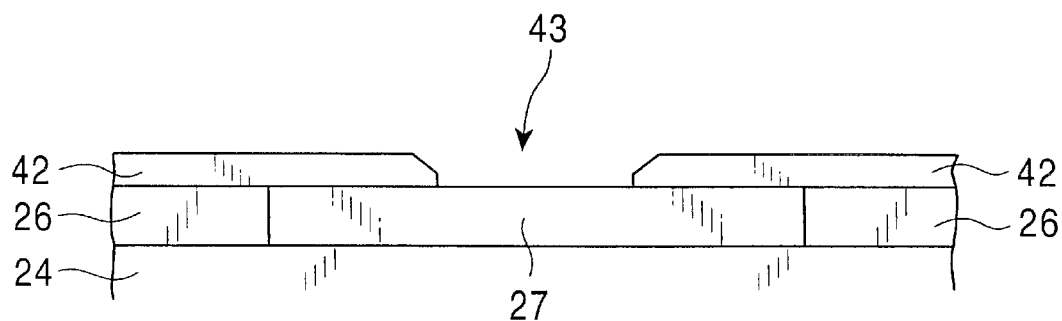
FIG. 28 is a front view illustrating the method of producing the thin film magnetic head in accordance with the second embodiment of the present invention.

After an inclined surface having a predetermined angle is formed at the edge of the pattern 73a, as shown in FIG. 27, the mask layer 73 and the insulating layer at the bottom of the pattern 73a are simultaneously etched by etching with the recovered anisotropy of reaction ion etching to form the trench 43, as shown in FIG. 28.

This embodiment can eliminate the photoresist step and the ion milling step of the first embodiment, and exhibits the effect of permitting shortening of the working process.

A thin film magnetic head and a method of producing the same in accordance with a third embodiment of the present invention will be described with reference to the drawings.

Figure 29:
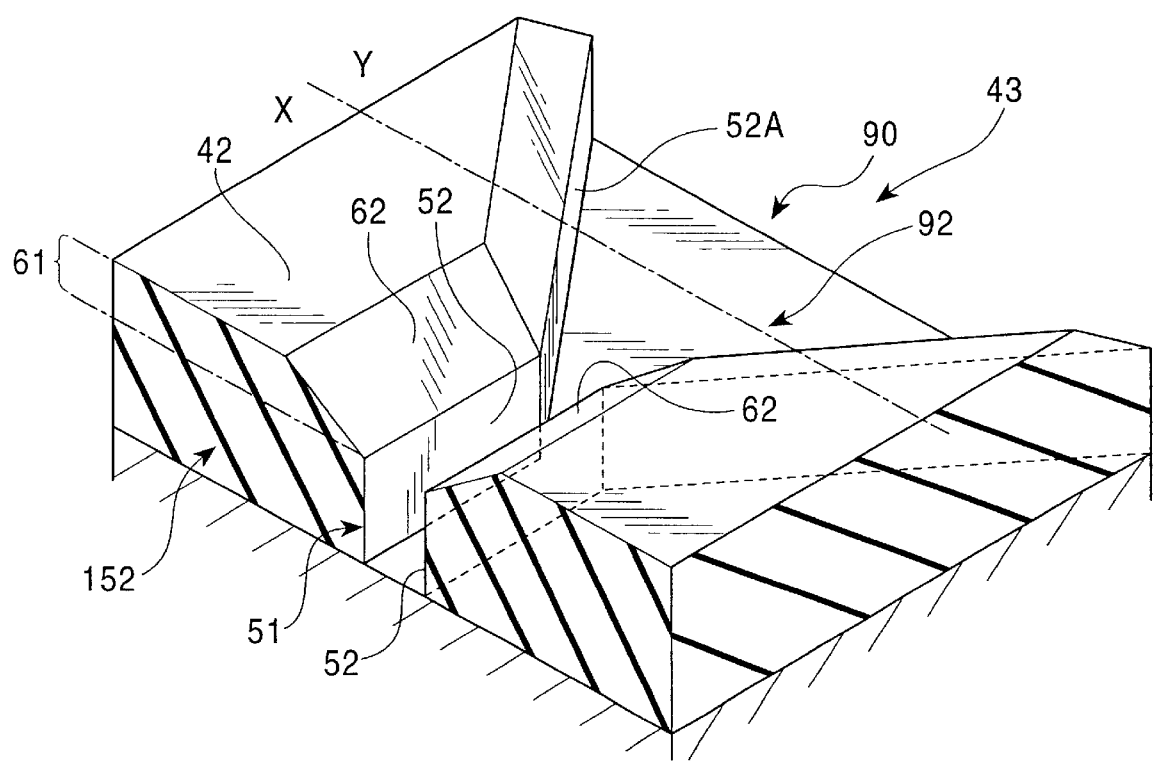
FIG. 29 is a perspective view showing a trench of a thin film magnetic head in accordance with a third embodiment of the present invention.
Figure 30:
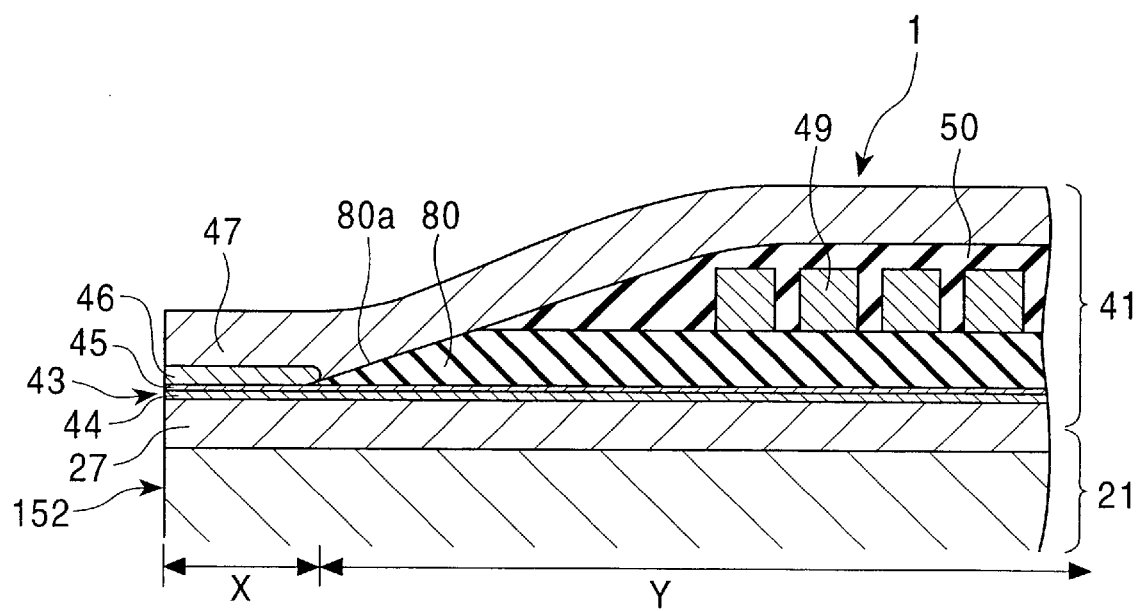
FIG. 30 is a sectional side view showing the thin film magnetic head in accordance with the third embodiment of the present invention.
Figure 31:
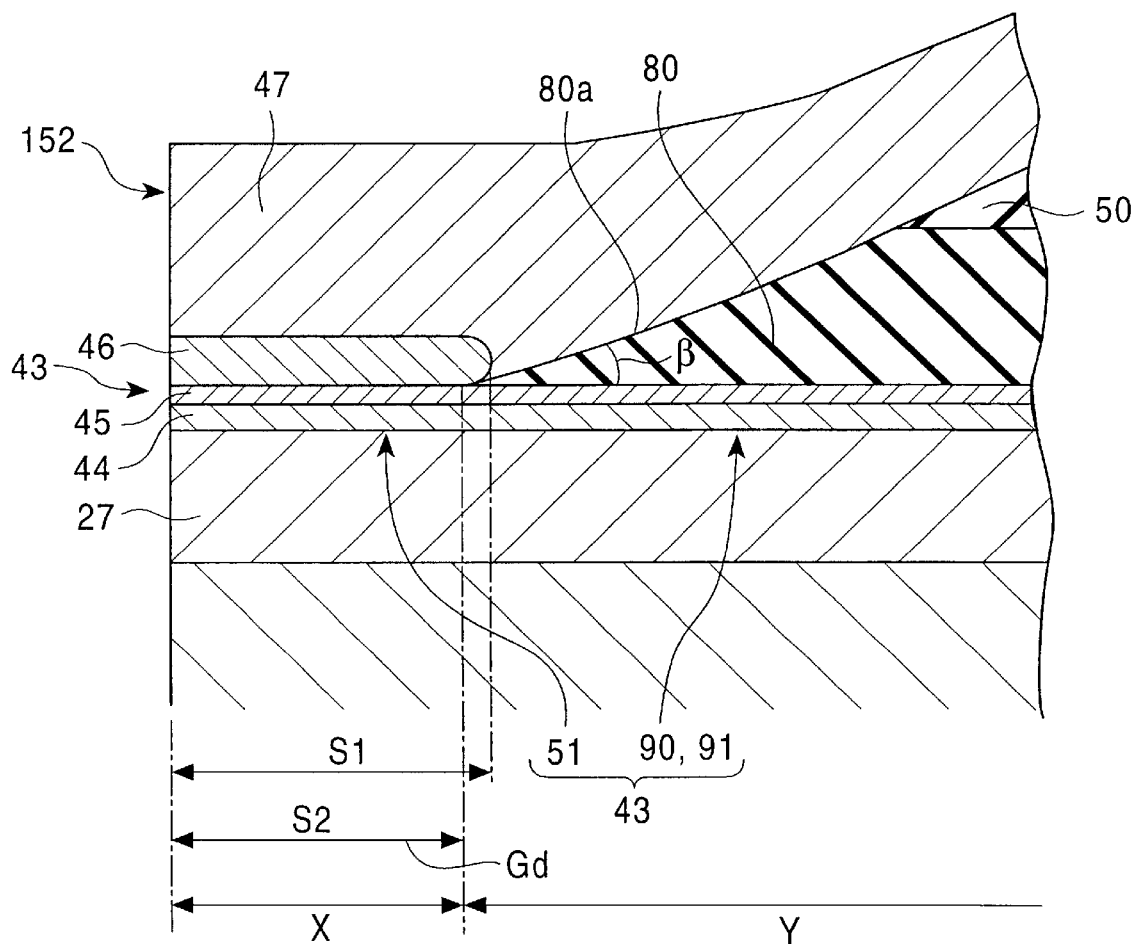
FIG. 31 is a sectional side view showing a principal portion of a pole tip region of the thin film magnetic head in accordance with the third embodiment of the present invention.

FIG. 29 is a perspective view showing a trench of the thin film magnetic head of this embodiment, and FIGS. 30 and 31 are a front view and a sectional side view, respectively, of the same thin film magnetic head.

In these drawings, substantially the same components as those of the first embodiment shown in FIGS. 1 to 24 are denoted by the same reference numerals, and the description thereof is omitted.

In this embodiment, the trench 43 comprises the trench main body 51, and the trench continuing portion 90 adjacent to the lower core layer 27, and continued from the trench main body 51 to extend to the back region Y, as shown in FIGS. 29 to 31. The trench main body 51 and the trench continuing portion 90 have the inclined portion 61 provided on the upper core layer 47 sides thereof.

The trench continuing portion 90 has a trench enlarged portion 92 connected to the back region Y side of the trench main body 51, and having a dimension in the width direction of the upper core layer 37 which increases in the direction to the back region Y side.

The trench main body 51 comprises the two parallel side walls 52 which are provided to stand on the lower core layer 27 and reach the medium-facing surface 152, and enlarged side walls 52A continued from the parallel side walls 52, and provided in the trench enlarged portion 92 with an increasing distance therebetween.

The inclined portion 61 comprises two side wall inclined surfaces 62 which are continued from the parallel side walls 52, and outwardly inclined in the width direction of the trench enlarged portion 92.

The lower pole layer 44 and the gap layer 45 are laminated in the trench main body 51 and the trench enlarged portion 92, and continued to a portion below the coil 49, the lower pole layer 44 being connected to the lower core layer 27.

The upper pole layer 46 is laminated in the trench main body 51 to extent to the inclined portion 61 in the pole tip region X, and connected to the upper core layer 47. As shown in FIG. 31, the upper pole layer 46 is formed so that the length S2 from the medium-facing surface 152 to the back insulating layer 80 in a portion of the upper pole layer 46, which contacts the upper core layer 47, is longer than the length S2 from the medium-facing surface 152 to the back insulating layer 80 in a portion of the upper pole layer 46, which contacts the gap layer 45. The gap depth Gd is defined by the length S2 from the medium-facing surface 152 to the back insulating layer 80 in the portion of the upper pole layer 46, which contacts the gap layer 45.

As shown in FIGS. 30 and 31, the back insulating layer 80 is laminated on the back region Y side of the gap layer 45 in the trench enlarged portion 92, and has the apex surface 80a inclined so that the thickness thereof increases from the medium-facing surface 152 to the back region Y side.

The insulating layer 42, the lower pole layer 44, the gap layer 45 and the upper pole layer 46 are exposed from the medium-facing surface 152.

In the above-described construction, the magnetic recording track width in the medium-facing surface 152 coincides with the width of the trench 43, and thus the magnetic recording track width can be decreased. Furthermore, the magnetic gap is exposed from the medium-facing surface 152, and thus magnetic recording on the magnetic recording medium can be efficiently performed by a leakage magnetic field from the magnetic gap.

Figure 32:
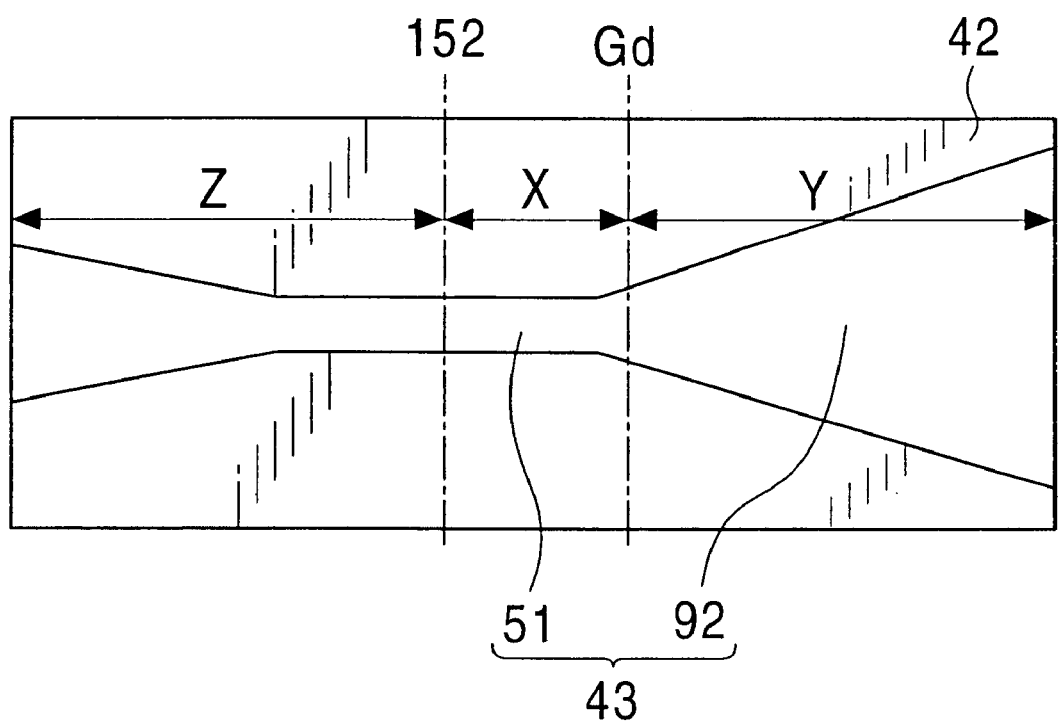
FIG. 32 is a front view illustrating a method of producing the thin film magnetic head in accordance with the third embodiment of the present invention.

In the thin film magnetic head of this embodiment, the trench 43 is formed to extend to the outside Z of the medium-facing surface in the pole tip region X, and extend from the medium-facing surface 152 to a portion of the back region Y through the pole tip region X, so that the upper side 27a of the lower core layer 27 is exposed from the bottom of the trench 43, as shown in FIG. 32. The width of the trench main body 51 is 1 μm or less, preferably 0.5 μm or less, and the width dimension of the trench enlarged portion 92 is set to increase in the direction to the back region Y.

The thin film magnetic head 41 exhibits the same effect as the first embodiment, and enables efficient magnetic recording on the magnetic recording medium by a leakage magnetic field from the magnetic gap.

The gap depth Gd of the magnetic gap is defined by the distance from the medium-facing surface 152 to the pole tip region X side end of the back insulating layer 80, and after the trench 43 is formed, the end of the upper pole layer 46, which constitutes the magnetic gap, can be set by the position and shape of the back insulating layer 80 made of photoresist. Therefore, the setting precision of the position of positive photoresist in the trench enlarged portion 92 can be improved, and thus no variation occurs in setting the gap depth Gd.

Furthermore, in the above-described thin film magnetic head 41, since the apex surface 80*a* is formed in the back insulating layer 80 in the trench enlarged portion 92 by post baking. It is thus possible to easily optimize the angle setting of the apex angle 80*a*, and further decrease a leakage magnetic field in the junction portion between the upper core layer 47 and the upper pole layer 46.

Because the width of the trench main body 51 is 1 μm or less, preferably 0.5 μm or less, the magnetic recording track width can be set to 1 μm or less.

EXAMPLES

In brief, a thin film magnetic heads of an example of the present invention having the structure of the first embodiment was produced, and a thin film magnetic head of a comparative example comprising an upper pole layer and a back insulating layer, which are formed by long throw sputtering using liftoff resist, was produced. The overwrite performances of the write heads of these thin film magnetic heads were measured.

Example

Like in the first embodiment shown in FIG. 5, an insulating layer (1.2 μm) was laminated on a lower core layer having a composition composed of 18% of Fe and 82% of Ni, and a trench having a width 1 μm was formed in the insulating layer. Then, a lower pole layer (0.2 μm) having a composition composed of 18% of Fe and 82% of Ni, and a gap layer (0.3 μm) comprising NiPd were laminated in the trench by electroplating. A positive resist comprising a novolak resin was coated to a thickness of 3 μm, followed by prebaking, exposure and development to form a back insulating layer (maximum thickness 2.8 μm). After the gap depth Gd of 1.0 μm from the medium-facing surface was set by the back insulating layer, an upper pole layer (0.5 μm) having a composition composed of 50% of Fe and 50% of Ni was formed by electroplating, and then a coil and an upper insulating layer were formed. Then, an upper core layer (2.5 μm) having a composition composed of 50% of Fe and 50% of Ni was formed to product a thin film magnetic head comprising a write head as an example. Here, each of the numerals in parentheses represents the thickness.

The back insulating layer was electrically insulated by post baking at 120° C. for 30 minutes and then UV curing or the like to form an apex surface having an apex angle β of 28° shown in FIG. 5.

Comparative Example

Figure 36:
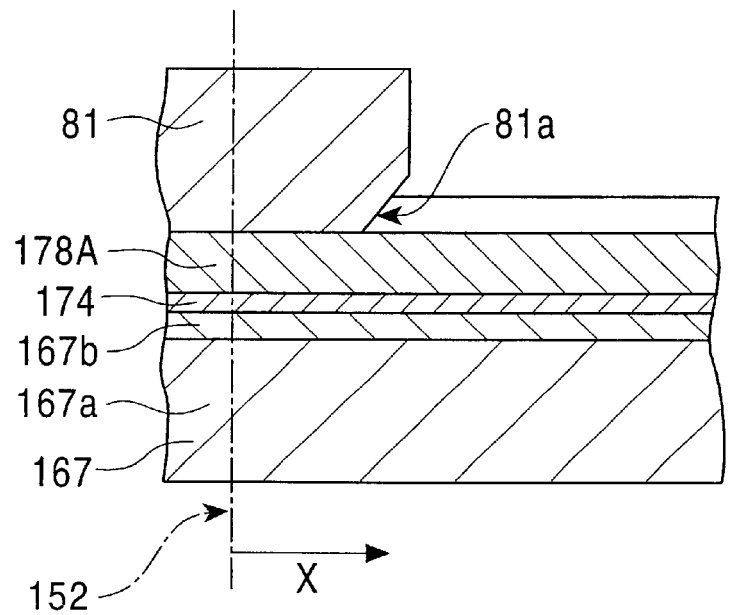
FIG. 36 is a sectional side view showing a step of the process for producing a conventional combination type thin film magnetic head.
Figure 37:
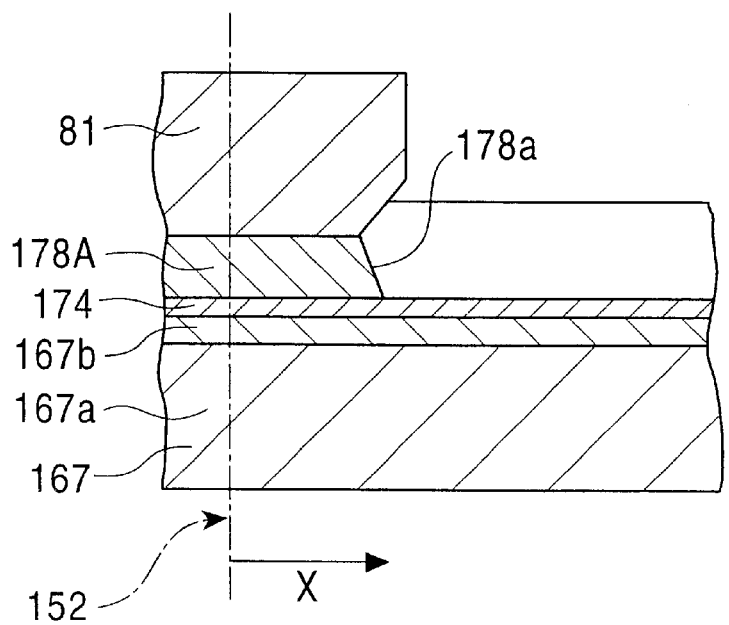
FIG. 37 is a sectional side view showing a step of the process for producing a conventional combination type thin film magnetic head.
Figure 38:
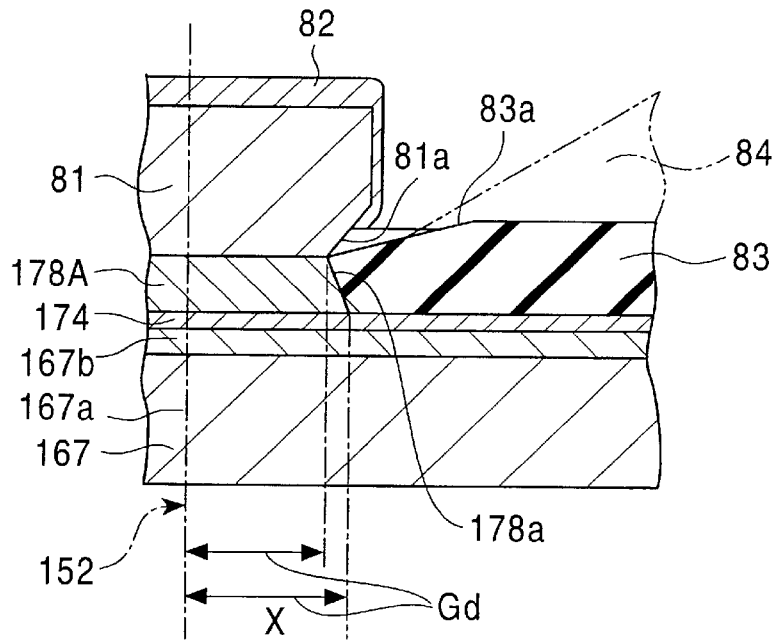
FIG. 38 is a sectional side view showing a step of the process for producing a conventional combination type thin film magnetic head.
Figure 39:
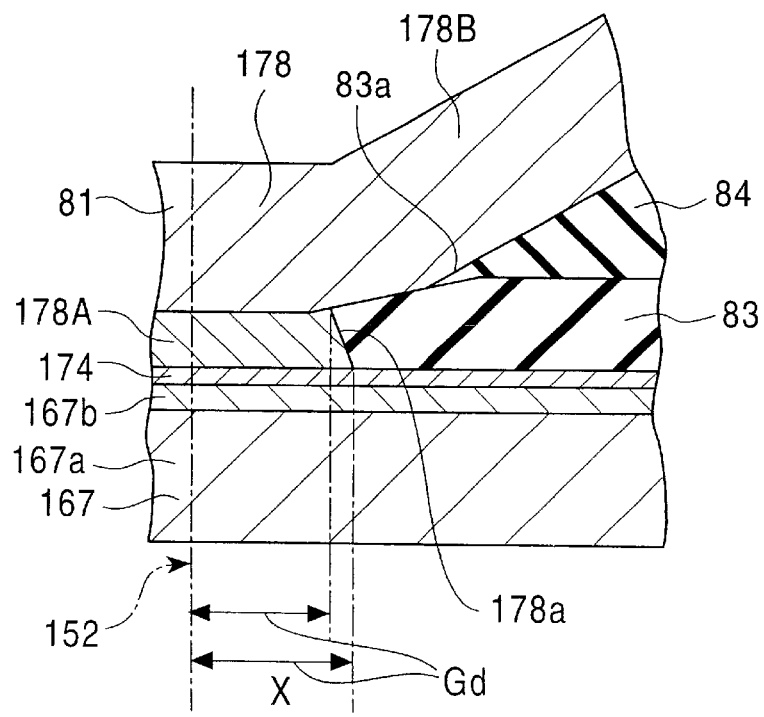
FIG. 39 is a sectional side view showing a step of the process for producing a conventional combination type thin film magnetic head.

Like in the above example, a trench was formed in an insulating layer, and a lower pole layer (0.2 μm) having a composition composed of 18% of Fe and 82% of Ni, a gap layer (0.3 μm) comprising NiPd, and an upper pole layer (0.5 μm) having a composition composed of 50% of Fe and 50% of Ni were laminated in the trench by electroplating. As shown in FIG. 36, a liftoff resist was formed by photolithography, and then the upper pole layer in the back region was removed by nonreactive ion beam etching to form a gap depth. Then a back insulating layer (maximum thickness 2.0 μm) comprising $Al_2O_3$ and having an apex surface was formed by anisotropic sputtering (long throw sputtering), and a coil insulating layer (5.0 μm) comprising a novolak positive resin and having an inclined surface continued from the apex surface was formed on the back insulating layer. A coil and an upper insulating layer were then formed, and an upper core layer (2.5 μm) having a composition composed of 50% of Fe and 50% of Ni was formed to produce a thin film magnetic head comprising a write head as a comparative example. Here, each of the numerals in parentheses represents the thickness.

In this comparative example, the angle of the apex surface was 25° which was substantially the same as the example.

In the thin film magnetic heads, the overwrite performance of each of the write heads was tested under the following conditions:

Recording current: 35 mA (magnetomotive force NI=0.35 A·T)

Thin film magnetic head-magnetic recording medium relative velocity: 24 m/sec

Recording frequency $f_1$: 10 MHz (linear recording density: 20 kFcz)

Overwrite frequency $f_2$: 60 MHz

|ow|: overwrite performance (dB)

$$|ow|=|20\ \log(v_i'/v_i)|$$

wherein $v_i$: output of $f_1$ (a basic frequency component passing through a bandpass filter)

$v_i'$: residual output of $f_1$ (the same basic frequency component) after recording $f_2$ As a result of the overwrite performance test, the following results were obtained.

| | Overwrite performance |
|---|---|
| Example | 40 ± 3 dB |
| Comparative Example | 35 ± 5 dB |

These results indicate that in the thin film magnetic head of the present invention, the setting precision of the position of the gap depth is improved to improve the overwrite performance of the write head.

The thin film magnetic head and the method of producing the thin film magnetic head of the present invention exhibit the following effects.

The length from the medium-facing surface to the back insulating layer made of a positive photoresist comprising a novolak resin in the portion of the upper pole layer which contacts the upper core layer is longer than the length from the medium-facing surface to the back insulating layer in the portion of the upper pole layer which contacts the gap layer, and the gap depth is defined by the length from the medium-facing surface to the back insulating layer in the portion of the upper pole layer which contacts the gap layer. In addition, a portion of the coil is provided on the back insulating layer, and thus the gap depth of the magnetic gap can be set by the position of the back insulating layer. It is thus possible to prevent variations in the distance from the medium-facing surface to the end of the upper pole layer, and thus prevent variations in the gap depth, improve the overwrite performance of the write head.

The lower pole layer, the gap layer, and the upper pole layer are laminated in the trench, and the apex surface is formed in the back insulating layer by post baking. Therefore, the presence of the apex surface causes a smooth magnetic field flow between the upper core layer and the upper pole layer, thereby preventing a leakage magnetic field from the connection portion between the upper core layer and the upper pole layer.

Since the lower pole layer, the gap layer and a portion of the upper pole layer are formed in the trench, and the width of the trench is 1 µm or less, preferably 0.5 µm or less, the magnetic recording track width can be set to 1 µm or less.

Furthermore, the insulating layer, the lower pole layer, the gap layer and the upper pole layer are exposed from the medium-facing surface. Therefore, the magnetic recording track width in the medium-facing surface coincides with the trench width of the insulating layer, and thus the magnetic recording track width can be set to a small value. In addition, magnetic recording on the magnetic recording medium can be efficiently performed by a leakage magnetic field from the magnetic gap.

The combination type thin film magnetic head comprises a lamination of a reading magnetic head comprising a magnetoresistive element, and the above-mentioned thin film magnetic head, and the use of the combination type thin film magnetic head can thus provide a magnetic recording device such as a computer or the like having high recording density and storage capacity.

In the thin film magnetic head and the method of producing the same of the present invention, since the back insulating layer is made of a positive photoresist comprising a novolak resin, the apex surface can be formed in the back insulating layer by post baking, and the upper pole layer can be formed by electroplating using the gap layer as an electrode. Therefore, the position setting precision of the gap depth can be improved, and the coil can be formed on the back insulating layer, thereby eliminating the need to laminate another insulating layer on the back insulating layer, the need to use a liftoff resist, and the need for the long throw sputtering step. It is thus possible to shorten the working time.

In the method of producing the thin film magnetic head of the present invention, the insulating layer is laminated on the lower core layer, and the trench is formed in the insulating layer to extend to the outside of the medium-facing surface in the pole tip region and extent from the pole tip region to the back region so that the bottom of the trench reaches the lower core layer, and the lower pole layer, the gap layer and the upper pole layer are formed in the trench, thereby permitting precise setting of the magnetic recording track width. Furthermore, since the back insulating layer comprising a positive photoresist such as a novolak resin or the like is laminated on the back region side of the gap layer, and the upper pole layer comprises a metal or the like which permits electroplating, thereby permitting lamination of the upper pole layer by electroplating using the gap layer as an electrode. The back insulating layer is formed on the back region side of the gap layer to define the gap depth position of the upper pole layer, and thus the upper pole layer having the gap depth defined by the back insulating layer in substantially parallel with the medium-facing surface can be formed on the pole tip region side of the gap layer. There is thus no need to use liftoff resist, and the gap depth position can thus be recognized as viewed in plane, improving the setting precision of the gap depth position.

For example, the apex surface is formed in the back insulating layer comprising a novolak resin by post baking. In this case, the gap between the lower and upper core layers in the back region of the trench can be increased without formation of another insulating layer on the back insulating layer, thereby improving the performance of the magnetic head, particularly the overwrite performance of the write head.

What is claimed is:

1. A thin film magnetic head comprising:
   an upper core layer and a lower core layer which are extended from a back region to a pole tip region so that the end surfaces thereof are exposed from a medium-facing surface, and which are connected to each other in the back region;
   a coil provided around the connection between the upper and lower core layers;
   a gap layer provided between the upper and lower core layers in the pole tip region;
   an insulating layer laminated on the lower core layer;
   a trench provided in the insulating layer to extend from the medium-facing surface in the pole tip region to the back region;
   a lower pole layer and the gap layer laminated in the trench;
   a back insulating layer laminated on the back region side of the gap layer; and
   an upper pole layer laminated on the pole tip region side of the gap layer;
   wherein the lower and upper pole layers are connected to the lower and upper core layers, respectively, the upper and lower pole layers form upper and lower pole tips, respectively, the back insulating layer is connected to the upper pole layer and the upper core layer, and the gap depth is determined by the length from the medium-facing surface to the back insulating layer in a portion of the upper pole layer which contacts the gap layer.

2. A thin film magnetic head according to claim 1, wherein the pole tip region side end of the back insulating layer is inserted into between the gap layer and the upper pole layer so that the gap depth is determined by the pole tip region side end of the back insulating layer.

3. A thin film magnetic head according to claim 1, wherein the back insulating layer comprises an apex surface which is inclined so that the thickness thereof increases from the medium-facing surface side to the back region side.

4. A thin film magnetic head according to claim 3, wherein the back insulating layer is made of a positive photoresist.

5. A thin film magnetic head according to claim 1, wherein a part of the coil is provided on the back insulating layer.

6. A thin film magnetic head according to claim 1, wherein the upper pole layer is provided in the trench.

7. A combination type thin film magnetic head comprising a lamination of a reading magnetic head comprising a magnetoresistive element, and a thin film magnetic head according to claim 1.

* * * * *